United States Patent
Gatto et al.

(10) Patent No.: US 9,846,721 B2
(45) Date of Patent: Dec. 19, 2017

(54) LOG FILE MANAGEMENT TOOL

(71) Applicant: GENESYS TELECOMMUNICATIONS LABORATORIES, INC., Daly City, CA (US)

(72) Inventors: Alan Gatto, Frimley (GB); Dean Cottle, Frimley (GB); Oleg Fylypenko, Frimley (GB); Shivakumar Gurusiddappa, Frimley (GB); Kevin Haselhuhn, Morrisville, NC (US); Greg Hollis, Saint John (CA); Luis Lamprea, Markham (CA); Sergey Aleksin, Frimley (GB); Gaurav Kumar, Toronto (CA); Narendra Datar, Markham (CA); Michael Pougnet, Saint John (CA); Poras Bharucha, Saint John (CA); Brett Dale, Brisbane (AU)

(73) Assignee: GENESYS TELECOMMUNICATIONS LABORATORIES, INC., Daly City, CA (US)

(*) Notice: Subject to any disclaimer, the term of this patent is extended or adjusted under 35 U.S.C. 154(b) by 304 days.

(21) Appl. No.: 14/209,790

(22) Filed: Mar. 13, 2014

(65) Prior Publication Data

US 2014/0280197 A1 Sep. 18, 2014

Related U.S. Application Data

(60) Provisional application No. 61/779,745, filed on Mar. 13, 2013.

(51) Int. Cl.
 G06F 17/20 (2006.01)
 G06F 17/30 (2006.01)
 G06F 11/34 (2006.01)

(52) U.S. Cl.
 CPC .... G06F 17/30424 (2013.01); G06F 11/3409 (2013.01); G06F 17/30289 (2013.01)

(58) Field of Classification Search
 CPC ......... G06F 17/30424; G06F 17/30289; G06F 11/3409
 USPC ................................................. 707/769, 741
 See application file for complete search history.

(56) References Cited

U.S. PATENT DOCUMENTS

| | | | | |
|---|---|---|---|---|
| 6,516,324 B1* | 2/2003 | Jones | ................... | G06F 19/321 707/769 |
| 7,106,850 B2* | 9/2006 | Campbell | ........... | H04M 3/5125 370/352 |
| 7,315,826 B1* | 1/2008 | Guheen | ............... | G06F 17/3089 703/27 |
| 7,428,303 B2* | 9/2008 | Campbell | ........... | H04M 3/5125 370/352 |
| 7,558,820 B2* | 7/2009 | Kimoto | ................... | A63F 13/12 463/29 |

(Continued)

*Primary Examiner* — Jean M Corrielus
(74) *Attorney, Agent, or Firm* — Lewis Roca Rothgerber Christie LLP

(57) ABSTRACT

A system includes: a processor; and a memory, wherein the memory stores instructions that, when executed by the processor, cause the processor to: retrieve a first log over a network from a first server of a plurality of servers for at least one contact center; generate an index of values in the first log; update an index database based on the index; and save the first log on a storage device.

12 Claims, 28 Drawing Sheets

(56) References Cited

U.S. PATENT DOCUMENTS

| | | | | |
|---|---|---|---|---|
| 7,594,012 B2* | 9/2009 | Singer | G06F 11/3495 | 707/999.01 |
| 7,739,230 B2* | 6/2010 | Bourne | G06F 17/301 | 707/603 |
| 7,809,398 B2* | 10/2010 | Pearson | H04M 1/274516 | 455/414.2 |
| 8,051,204 B2* | 11/2011 | Kai | G06Q 10/06 | 709/242 |
| 8,090,771 B2* | 1/2012 | Kimoto | A63F 13/12 | 463/29 |
| 8,341,120 B2* | 12/2012 | Barton | G06F 17/30345 | 707/640 |
| 8,589,428 B2* | 11/2013 | Smith | G06F 11/3476 | 707/760 |
| 9,116,649 B2* | 8/2015 | Ito | G06F 3/1273 | |
| 9,160,621 B2* | 10/2015 | Kaneko | H04L 41/069 | |
| 9,317,539 B2* | 4/2016 | Sato | G06F 17/30289 | |
| 9,355,111 B2* | 5/2016 | He | G06F 17/30144 | |
| 2002/0138296 A1* | 9/2002 | Holmes, Jr. | H04L 47/10 | 705/34 |
| 2002/0184366 A1* | 12/2002 | Kimoto | A63F 13/12 | 709/224 |
| 2005/0055351 A1* | 3/2005 | Barton | G06F 17/30345 | |
| 2005/0125531 A1* | 6/2005 | Singer | G06F 11/3495 | 709/224 |
| 2006/0020616 A1* | 1/2006 | Hardy | G06F 17/30619 | |
| 2006/0117091 A1* | 6/2006 | Justin | G06F 11/3476 | 709/217 |
| 2007/0223683 A1* | 9/2007 | Pearson | H04M 1/274516 | 379/355.01 |
| 2007/0282470 A1* | 12/2007 | Hernandez | G06F 11/0709 | 700/90 |
| 2009/0020616 A1* | 1/2009 | Zoister | B42D 25/00 | 235/493 |
| 2009/0043825 A1* | 2/2009 | Bourne | G06F 17/301 | |
| 2009/0252474 A1* | 10/2009 | Nashida | G11B 27/034 | 386/248 |
| 2009/0265424 A1* | 10/2009 | Kimoto | A63F 13/12 | 709/203 |
| 2012/0120441 A1* | 5/2012 | Kaneko | H04L 41/069 | 358/1.15 |
| 2012/0246303 A1* | 9/2012 | Petersen | G06F 17/30185 | 709/224 |
| 2013/0031613 A1* | 1/2013 | Shanabrook | G06F 21/552 | 726/4 |
| 2014/0149466 A1* | 5/2014 | Sato | G06F 17/30289 | 707/803 |
| 2014/0280197 A1* | 9/2014 | Gatto | G06F 17/30424 | 707/741 |
| 2015/0317327 A1* | 11/2015 | He | G06F 17/30327 | 707/693 |

* cited by examiner

LOG FILE MANAGEMENT TOOL

CROSS-REFERENCE TO RELATED APPLICATION

This patent application claims the benefit of U.S. Provisional Patent Application Ser. No. 61/779,745, filed in the United States Patent and Trademark Office on Mar. 13, 2013, titled "Log File Management Tool," the entire content of which is incorporated herein by reference.

BACKGROUND

When providing technical support for computer systems, support specialists often use log files generated by various components of the systems to diagnose technical issues. Such logs are generally stored in various locations scattered across various computers (e.g., servers) of the software system and across the file systems of those computers, thereby complicating collecting those logs from a customer computer system installation.

In addition, the various servers of the software systems often have limited storage space available for logs, thereby reducing the detail of the information and length of the history. This loss of detail and reduced history length may make diagnosis of the customer's technical issues difficult or impossible.

SUMMARY

Aspects of embodiments of the present invention are directed to a log file management system (or log file management tool) for collecting, storing, indexing, compressing, and transferring log files from a computer system. According to one embodiment of the present invention, a system collects logs from applications, stores them on a designated server, and indexes the collected logs so that, when a problem occurs in a customer environment, a set of logs may be packaged and sent to technical support to help diagnose the problem. The particular set of logs may be tailored based on the date and time of the problem as well as the particular components (e.g., particular software applications) of the computer system that are likely components of or contributors to the problem. The logs may also be displayed on a customer support agent's computer.

Aspects of embodiments of the present invention are also directed toward systems capable of detecting current log settings and recommending best practice settings.

According to one embodiment of the present invention, a system includes: a processor; and a memory, wherein the memory stores instructions that, when executed by the processor, cause the processor to: retrieve a first log over a network from a first server of a plurality of servers for at least one contact center; generate an index of values in the first log; update an index database based on the index; and save the first log on a storage device.

The memory may further store instructions that, when executed by the processor, cause the processor to retrieve a second log from a second server of the plurality of servers.

The first log and the second log may be generated by different software applications.

The first server and the second server may be associated with different contact centers.

The memory may further store instructions that, when executed by the processor, cause the processor to compress the first log before saving the first log on the storage device.

The memory may further store instructions that, when executed by the processor, cause the processor to process the first log before saving the first log on the storage device by: determining a file type of the first log; determining one or more searchable tokens associated with the file type; searching the first log for the one or more searchable tokens to identify one or more matches; determining if the token is to be scrubbed; replacing the one or more matches with scrubbed data if the token is to be scrubbed; and updating the index with the token value and a location of the token in the first log.

The memory may further store instructions that, when executed by the processor, cause the processor to purge a plurality of log files from the storage device, wherein the purged log files are older than a set time period.

According to one embodiment of the present invention, a system includes: a processor; and a memory, wherein the memory stores instructions that, when executed by the processor, cause the processor to: receive a request for logs associated with a service; query a configuration server for a list of servers associated with the service, the servers being for at least one contact center; retrieve a plurality of logs collected from the servers of the list of servers, the servers being connected to the processor over a network; and package the retrieved logs into a file.

The configuration server may be configured to determine the list of servers by: identifying, based on configuration information, a first server associated with the service; and identifying, based on the configuration information, one or more servers having a dependency relationship with the first server.

The configuration server may be configured to determine the list of servers by: identifying a relationship graph associated with the service; identifying a plurality of related applications the relationship graph; and identifying a plurality of servers based on the identified related application.

The request may further include login credentials, and the memory may further store instructions that, when executed by the processor, cause the processor to retrieve the logs in accordance with restrictions associated with the login credentials.

The memory may further store instructions that, when executed by the processor, cause the processor to retrieve the logs from a storage device coupled to the servers over a network.

The memory may further store instructions that, when executed by the processor, cause the processor to retrieve a log of the plurality of logs from a storage device coupled directly to a server of the servers.

According to one embodiment of the present invention, a system includes: a processor; and a memory, wherein the memory stores instructions that, when executed by the processor, cause the processor to: receive a request for logs, the request including search criteria including at least one of an error code or a session identifier; search an index database for the search criteria; retrieve a plurality of logs matching the search criteria, the logs being collected from a plurality of servers for at least one contact center; and package the retrieved logs into a file.

The request may further include filtering criteria, and the memory may further store instructions that, when executed by the processor, cause the processor to filter the retrieved logs to remove lines to return only lines that match the filtering criteria.

The filtering criteria may include at least one of an error code, a session identifier, a log level, and a keyword.

The search criteria may include a service request number.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Figure 1:
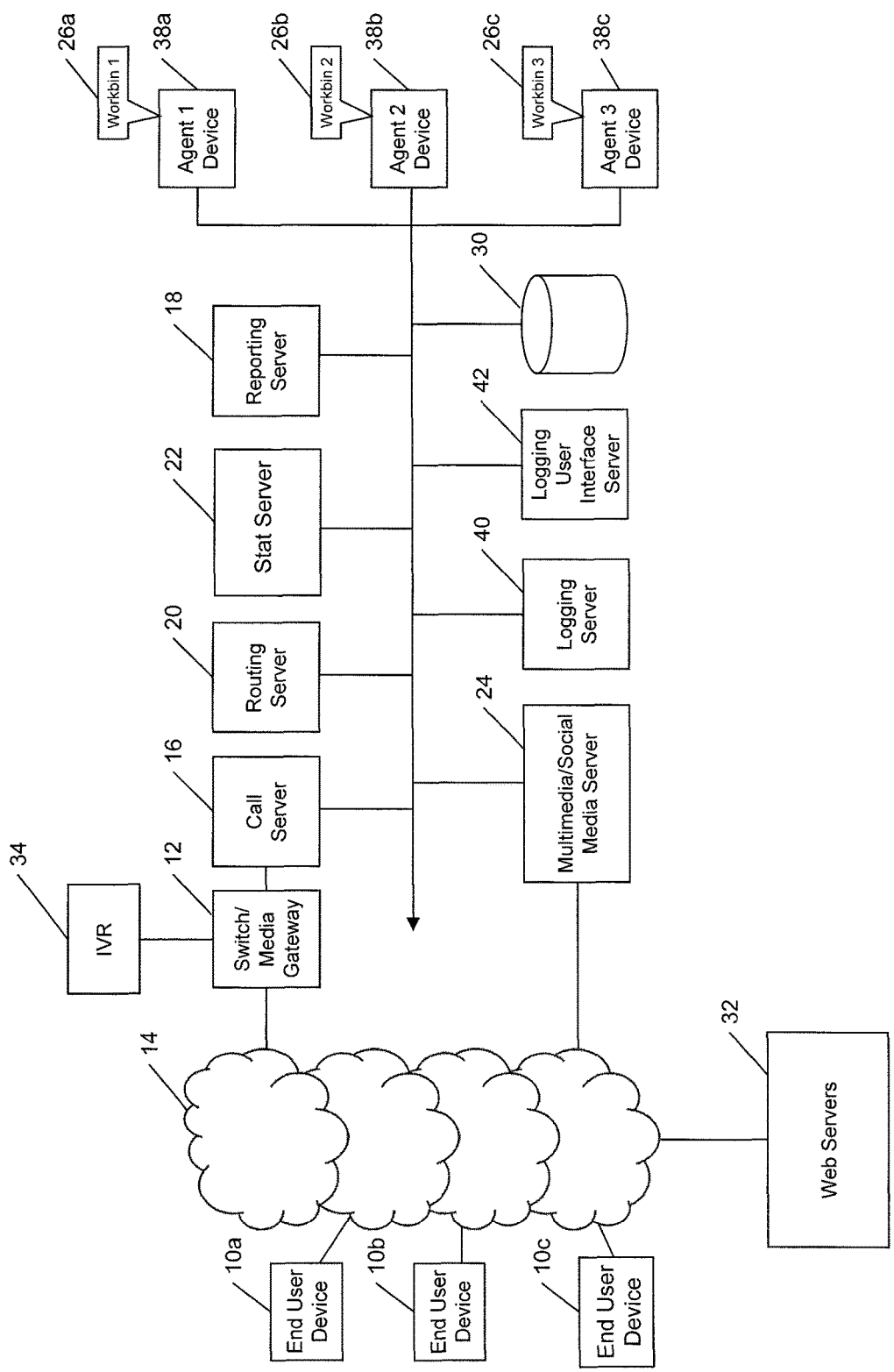
FIG. 1 is a schematic block diagram of a system supporting a contact center that is configured to provide customer availability information to customer service agents according to one exemplary embodiment of the invention.

FIG. 1 is a schematic block diagram of a system supporting a contact center 102 that is configured to provide customer availability information to customer service agents according to one exemplary embodiment of the invention. The contact center 102 may be an in-house facility to a business or corporation for serving the enterprise in performing the functions of sales and service relative to the products and services available through the enterprise. In another aspect, the contact center 102 may be a third-party service provider. The contact center 102 may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center 102 includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center 102 may initiate inbound calls to the contact center 102 via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center 102 includes a switch/media gateway 12 coupled to the communications network 14 for receiving and transmitting calls between end users and the contact center 102. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center 102.

The contact center 102 may also include a multimedia/social media server for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center 102. End users may browse the web pages and get information about the enterprise's products and services. The web pages may also provide a mechanism for contacting the contact center 102, via, for example, web chat, voice call, email, web real time communication (WebRTC), or the like.

According to one exemplary embodiment of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls.

In one example, while an agent is being located and until such agent becomes available, the call server may place the call in, for example, a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to a corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center 102 and performing data processing associated with contact center operations, and for interfacing with customers via a variety of communication mechanisms such as chat, instant messaging, voice calls, and the like.

The selection of an appropriate agent for routing an inbound call may be based, for example, on a routing strategy employed by the routing server 20, and further based on information about agent availability, skills, and other routing parameters provided, for example, by a statistics server 22.

The multimedia/social media server 24 may also be configured to provide, to an end user, a mobile application for downloading onto the end user device 10. The mobile application may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center 102 may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the contact center 102 also includes one or more mass storage devices 30 for storing different databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

According to one embodiment of the present invention, the contact center 102 also includes a logging server 40 configured to collect and store logs from the other servers within the contact center 102 and a logging user interface server 42 configured to provide a user interface for configuring and retrieving logs from the logging server 40.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2:
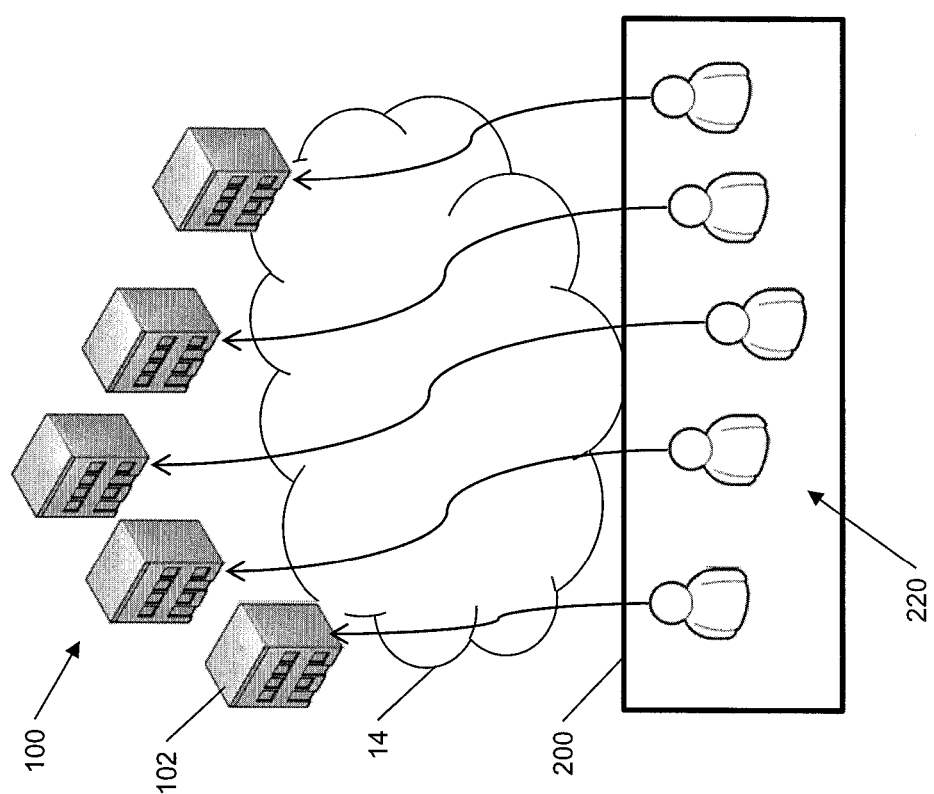
FIG. 2 is a schematic diagram illustrating a plurality of customer support agents at a customer support contact center accessing logs stored on a plurality of customer computer systems over a network according to one embodiment of the present invention.

FIG. 2 is a schematic diagram illustrating a plurality of customer support agents 220 at a customer support contact center 200 accessing logs stored on a plurality of customer sites 100 with computer systems (e.g., contact centers) over a computer network 14 (e.g., the Internet) according to one embodiment of the present invention.

Figure 3:
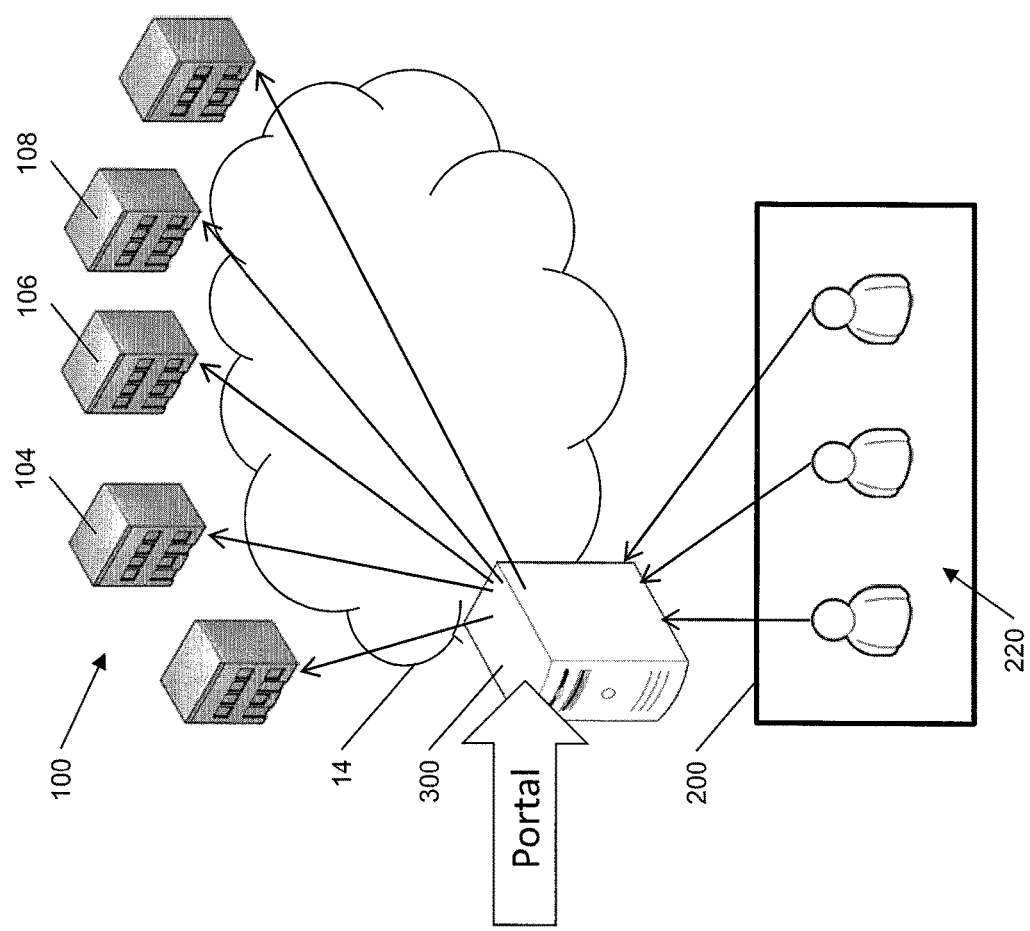
FIG. 3 is a schematic diagram illustrating a plurality of customer support agents at a customer support contact center accessing logs stored on a plurality of customer computer systems over a network via a log management portal according to one embodiment of the present invention.

FIG. 3 is a schematic diagram illustrating a plurality of customer support agents 220 at a customer support contact center 200 accessing logs stored on a plurality of customer computer systems 102 over a computer network 14 (e.g., the Internet) via a portal 300 according to one embodiment of the present invention.

Figure 4:
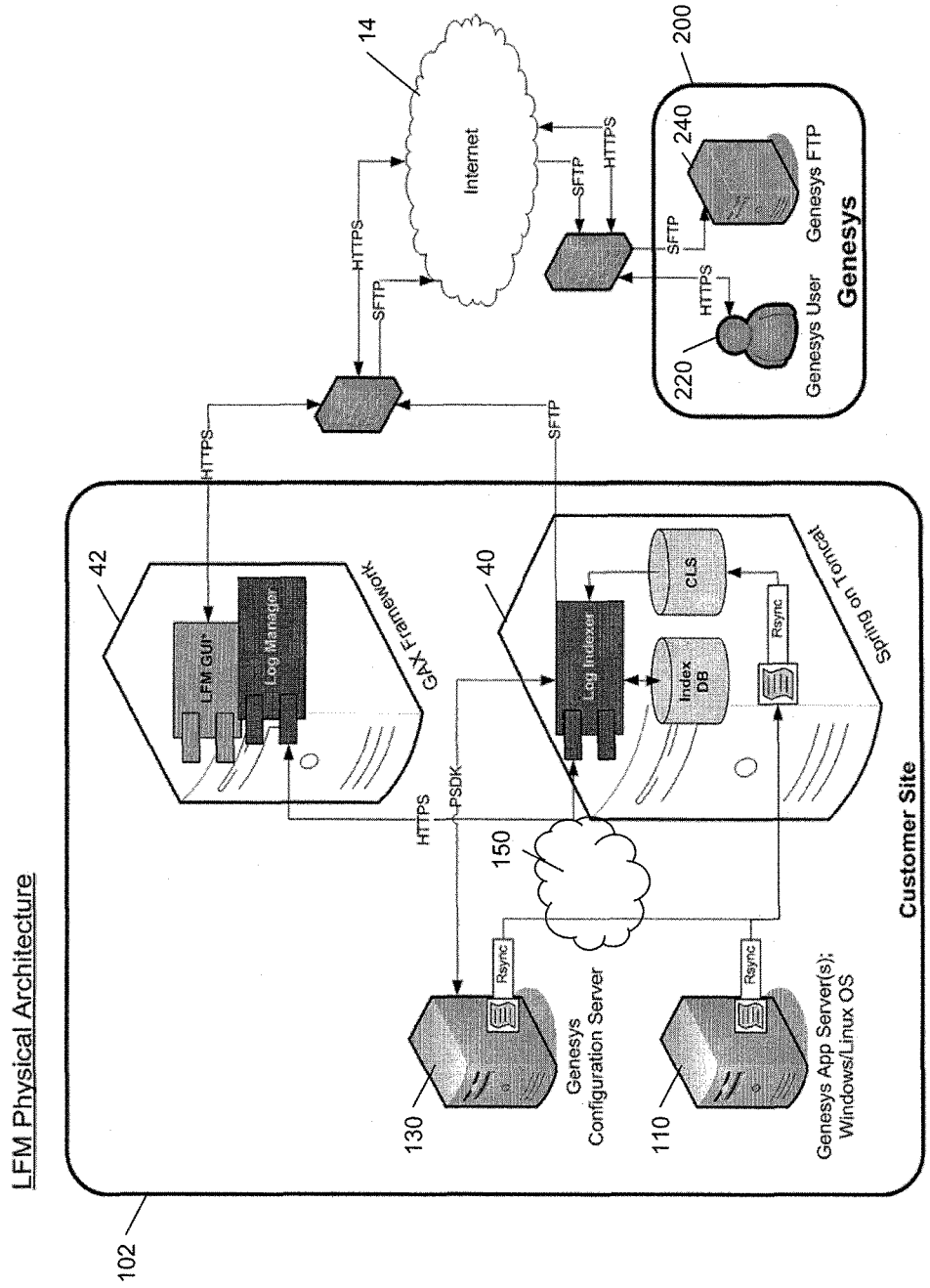
FIG. 4 is a schematic diagram illustrating a physical architecture for a log file management system according to one embodiment of the present invention.

FIG. 4 is a schematic diagram illustrating a physical architecture for a log file management system (or log file management tool) according to one embodiment of the present invention. A customer site 102 (e.g., the contact center of FIG. 1) includes one or more application servers 110 and a configuration server 130, which are configured to communicate with the logging server 40 over a network 150 (e.g., a local area network). The application servers 110 run various applications to provide support for the operation of the computer system. These application servers may provide functions such as messaging, routing, session management, data storage (e.g., databases), data caches, telephony, text chat, etc. For example, these application servers 110 may include the call server 16, the reporting server 18, the routing server 20, the statistics server 22, the multimedia/social media server 24, and the mass storage device 30 shown in the contact center 102 of FIG. 1.

The configuration of applications on these application servers 110, including the interrelationships and interdependencies are managed and tracked by the configuration server 130. The interrelationships and interdependencies between the application servers 110 and the applications running on them may be represented in the configuration server as a relationship graph, in which vertices (or nodes) of the graph represent applications and/or application servers 110 and edges between vertices represent interrelationships and interdependencies.

According to one embodiment, the customer site 104 also includes a logging user interface server 42 configured to interface with the logging server 40. The logging server 40 and the logging user interface server 42 are connected (for example, behind a firewall) to an external network 14 (e.g., the Internet) such that they are able to communicate with support agents and servers 240 (also generally behind a firewall) in a customer support contact center 200.

Figure 5:
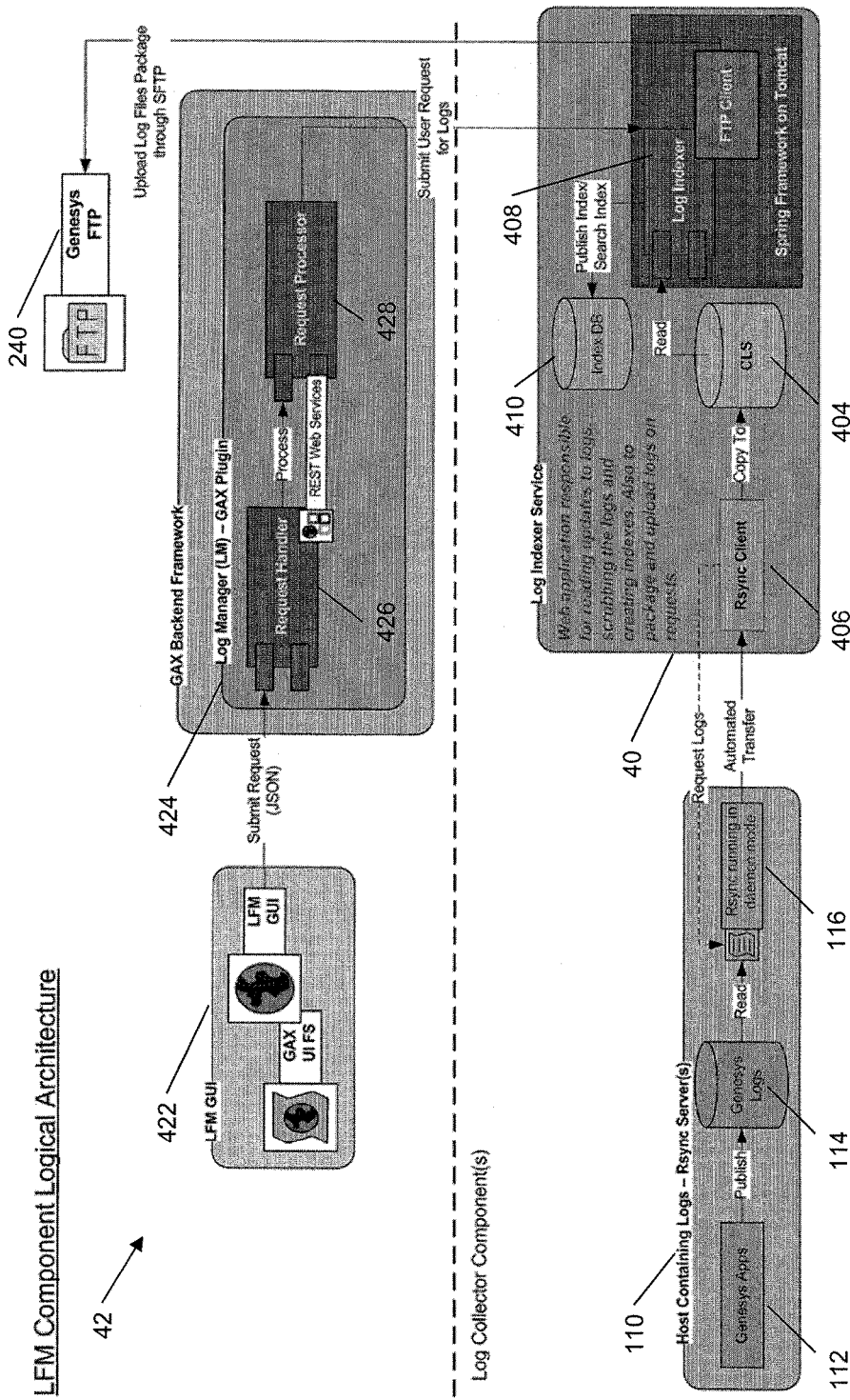
FIG. 5 is a schematic diagram illustrating a functional architecture for a log file management system according to one embodiment of the present invention.

FIG. 5 is a schematic diagram illustrating a functional architecture of components of a log file management system according to one embodiment of the present invention. The customer support contact center 200 may also have one or more servers described with respect to FIG. 1. In the illustrated embodiment, the application server 110 includes one or more running applications 112 which publish logs to a storage device 114 (e.g., a hard drive) in the application server 110. A log transmission program 116 running on the application server 110 receives requests for the logs saved on the storage device 114 and transmits those logs over the network (e.g., to a logging server) in response to the requests. In one embodiment, a network copying program (e.g., the "rsync" program) may be used as the log transmission program 116. However, embodiments of the present invention are not limited thereto and other software capable of transmitting files over a network may be used, such as a Server Message Block (SMB) based program, remote copy (RCP), secure copy (SCP), file transfer protocol (FTP), and SSH file transfer protocol (SFTP).

According to one embodiment, the logging server 40 includes a log retriever program 406 configured to communicate with the log transmission program 116 running on the application server 110. Logs retrieved by the log retriever program (or log retriever) 406 are stored in a central log storage repository (CLS) 404. The logs stored in the central log storage repository (CLS) may be periodically indexed, or indexed when new logs arrive, by a log indexer 408, which publishes the indexes to an index database 410.

In the embodiment of FIG. 5, the logging user interface server 42 includes a graphical user interface component 422, which provides, for example, a web browser based interface to the log manager tool 424. The log manager tool includes a request handler 426 for receiving the requests from the user interface and supplying those requests to a request processor 428. The request processor 428 submits the requests to the logging server 40. In response to requests for logs, in some embodiments, the logging server 40 transmits logs back to a support contact center server 240 (e.g., an FTP server) at the support contact center 200. In other embodiments, the logging server 40 sends an email with the requested logs attached to the support contact center 200.

In some embodiments, various types of application servers 110 runs different types of log transmission programs 116. For example, a Linux machine may use an rysnc daemon and a Windows® machine may use the Server Message Block (SMB) protocol to transmit files. The logging server 40 may include various types of log retriever programs 406 to communicate with the various types application servers 110.

Figure 6:
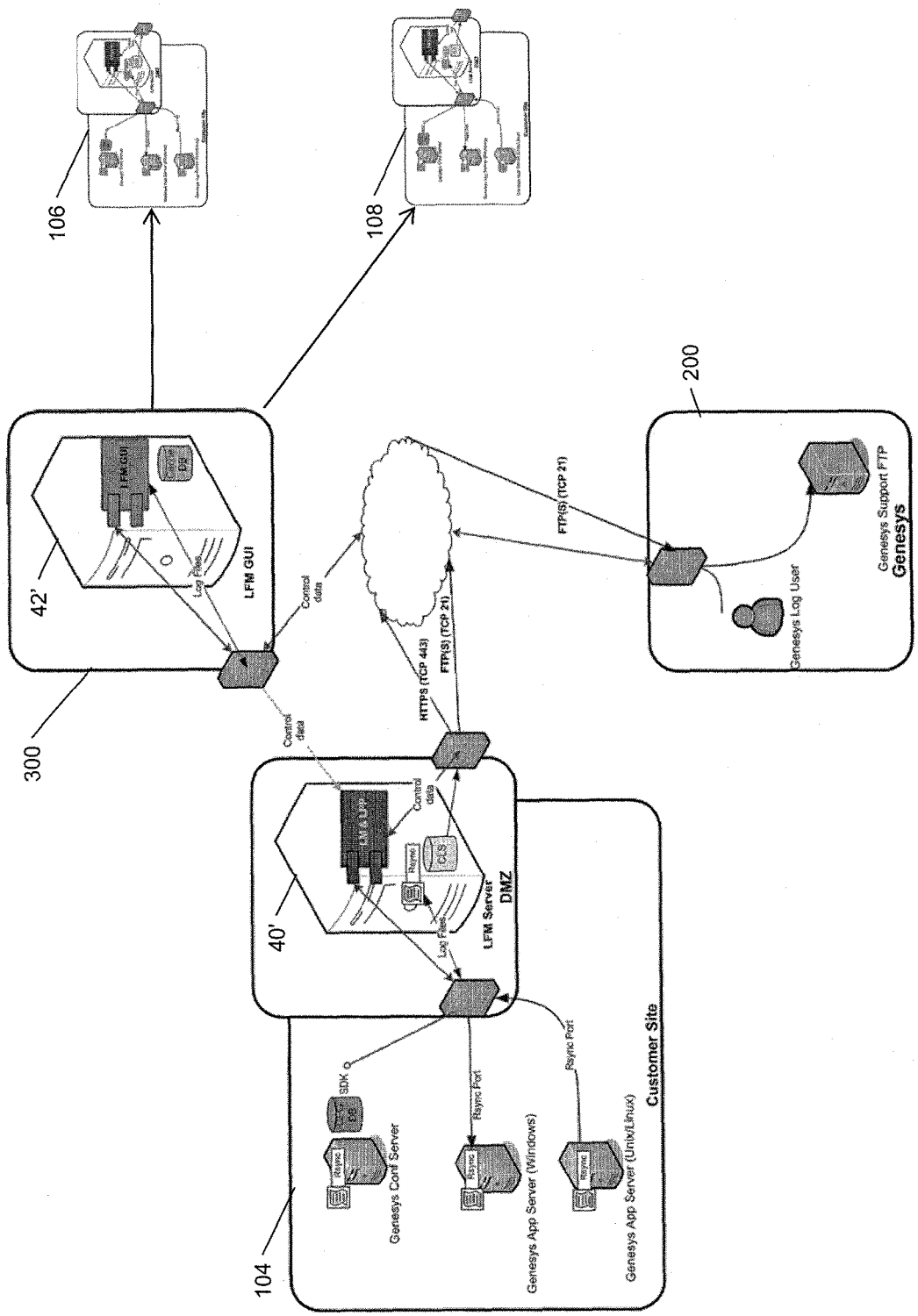
FIG. 6 is a schematic diagram illustrating a physical architecture for a log file management system using a log management portal according to one embodiment of the present invention.

FIG. 6 is a schematic diagram of a physical architecture for a log file management system in a multi-customer configuration according to one embodiment of the present invention. In the embodiment shown in FIG. 6, three customer sites 104, 106, and 108 are illustrated and, in this embodiment, these customer sites are substantially similar to the customer site 102 of FIG. 4. Descriptions of substantially similar components (referred to with similar reference numerals) will not be repeated herein. Likewise, the support contact center 200 in this embodiment is substantially the same as the support contact center illustrated in FIG. 4.

The logging server 40' in the embodiment of FIG. 6 differs from the logging server 40 of the embodiment of FIG. 6 due to the inclusion of a log manager component. In addition, the logging user interface server 42' may be located outside of the customer sites 100 and may be used to access logging servers of multiple customer sites 100, as will be described in more detail below in reference to FIG. 7.

Figure 7:
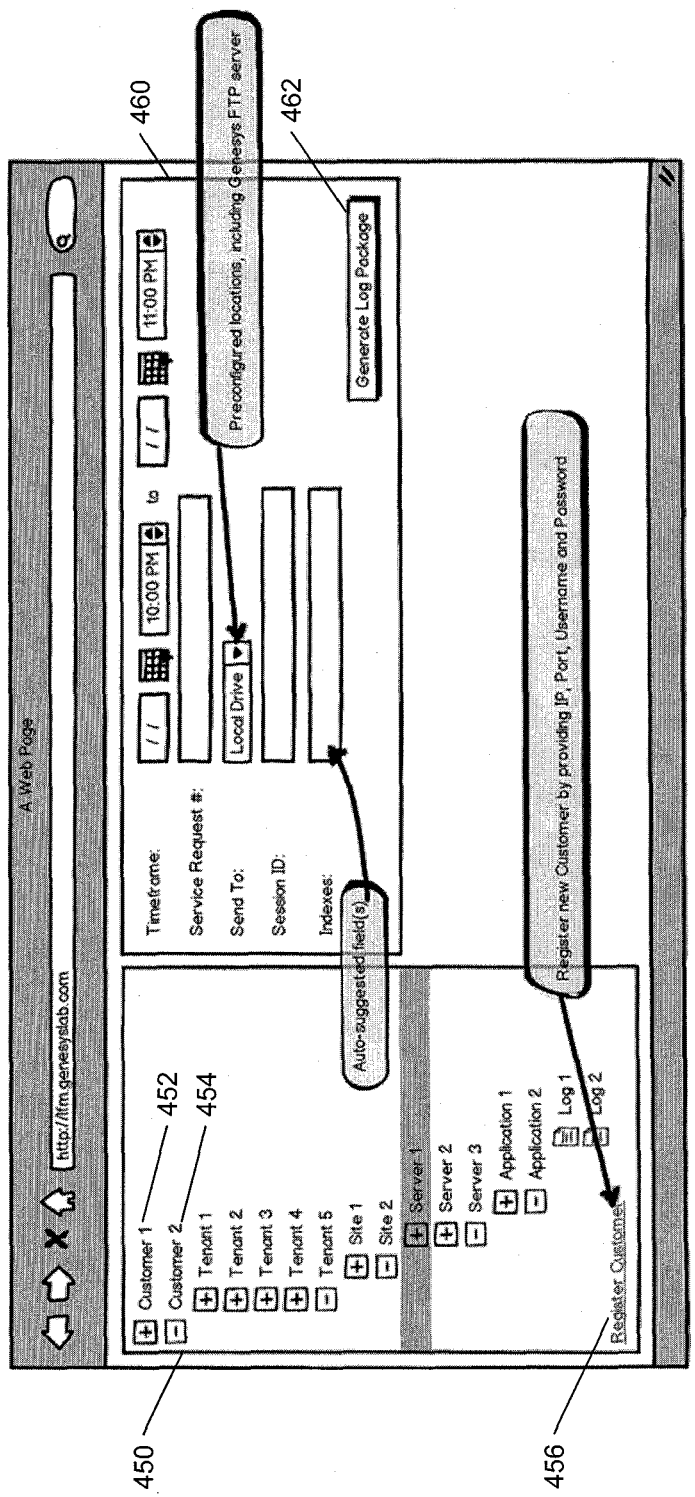
FIG. 7 is a screenshot of a user interface for accessing customer logs according to one embodiment of the present invention.

FIG. 7 is a screenshot of a user interface for accessing customer logs according to one embodiment of the present invention. The user interface is provided by the logging user interface server 42, which is, for example, a web server configured to provide a user interface to and receive requests from a web browser. In the embodiment shown in FIG. 7, an asset browser 450 shows a plurality of logs organized hierarchically in a tree based on, for example, customer site identifiers 452 and 454 ("Customer 1", "Customer 2"), tenant identifiers ("Tenant 1", "Tenant 2", . . . ), physical site identifiers ("Site 1", "Site 2", . . . ), application server identifiers ("Server 1", "Server 2", . . . ), application identifiers ("Application 1", "Application 2", . . . ), and log identifiers ("Log 1", "Log 2"), thereby allowing a user to browse through customer sites, applications, and logs that are available to the current user.

Additional customers sites may be accessed by the user interface by actuating (e.g., clicking on) a "Register Customer" button 456, causing the user interface to then prompt the user for login credentials such as an IP address, a port, a username, and a password for the new customer site to be registered. In some embodiments of the present invention, the login may be handled by a system wide administration server.

The user interface also includes a request builder 460. The request builder allows a user to construct a request for logs by specifying, for example, a timeframe for the requested logs (e.g., start date and time to end date and time), a session identifier for identifying the session that encountered a problem, keywords to search for within the indexes of the logs, error messages, error codes, issue types, log file types, and file names. Embodiments of the present invention also allow the entry of a service request number to assist a customer support agent in identifying the particular case that the logs pertain to. The user interface also allows a user to select which of a variety of preconfigured locations to send the log to, such as saving the logs to a local drive, transmitting the logs to the support contact center server 240, and emailing the logs to a customer support agent 220. In some embodiments of the present invention, the request builder 460 also includes a field for selecting the name of an application 112 that appears to be causing problems. The request builder also allows users to further filter logs or portions of logs (e.g., on a line-by-line basis) based on matching criteria such as log level, file name, error message, error code, session identifier, and keyword.

After a user has entered the information required to generate a request, a "Generate Log Package" button 462 is used to submit the request to the logging user interface server 42, which, in turn, submits the request to the proper log manager tool 424.

Figure 8:
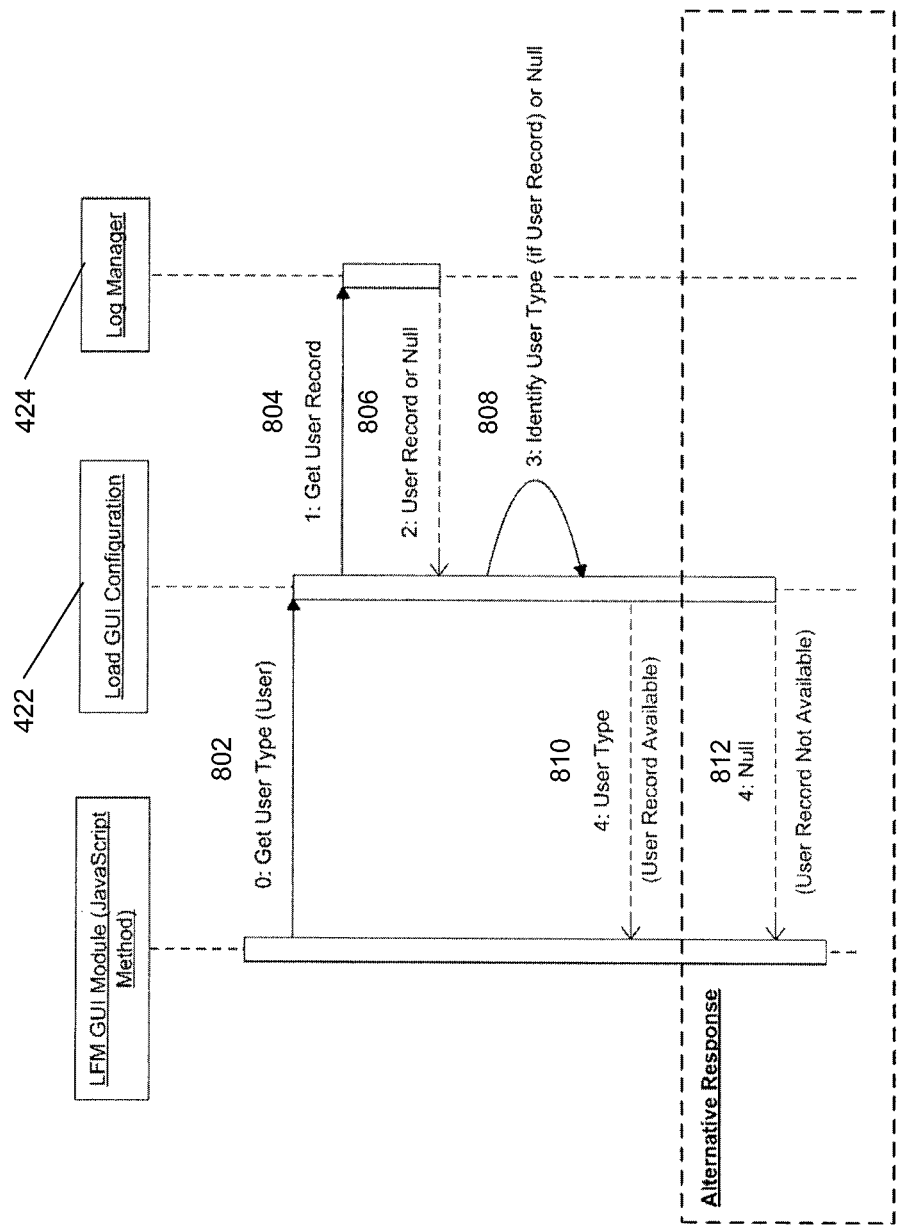
FIG. 8 is a messaging diagram illustrating a method for identifying a user type in accordance with one embodiment of the present invention.

As described above, the user interface includes an asset browser 450, which allows the user to browse through customer sites, applications, and logs that are available to the current user. FIG. 8 is a messaging diagram illustrating a method for identifying a user type in accordance with one embodiment of the present invention. Examples of user types include: a customer, a customer support agent, or a customer support agent partner. After a user has logged in to the logging graphical user interface, a request is sent to the graphical user interface component 422 to get a user type in step 802. A user record is then requested from the log manager 424 in step 804 and a response is provided to the user interface server 42 in step 806. If no user record is found, then the log manager 424 returns a null value. The user interface server 42 then identifies a user type based on the returned information in step 808 and returns the loaded user type to the user interface in step 810 or returns null in step 812 if no record was found.

Figure 9:
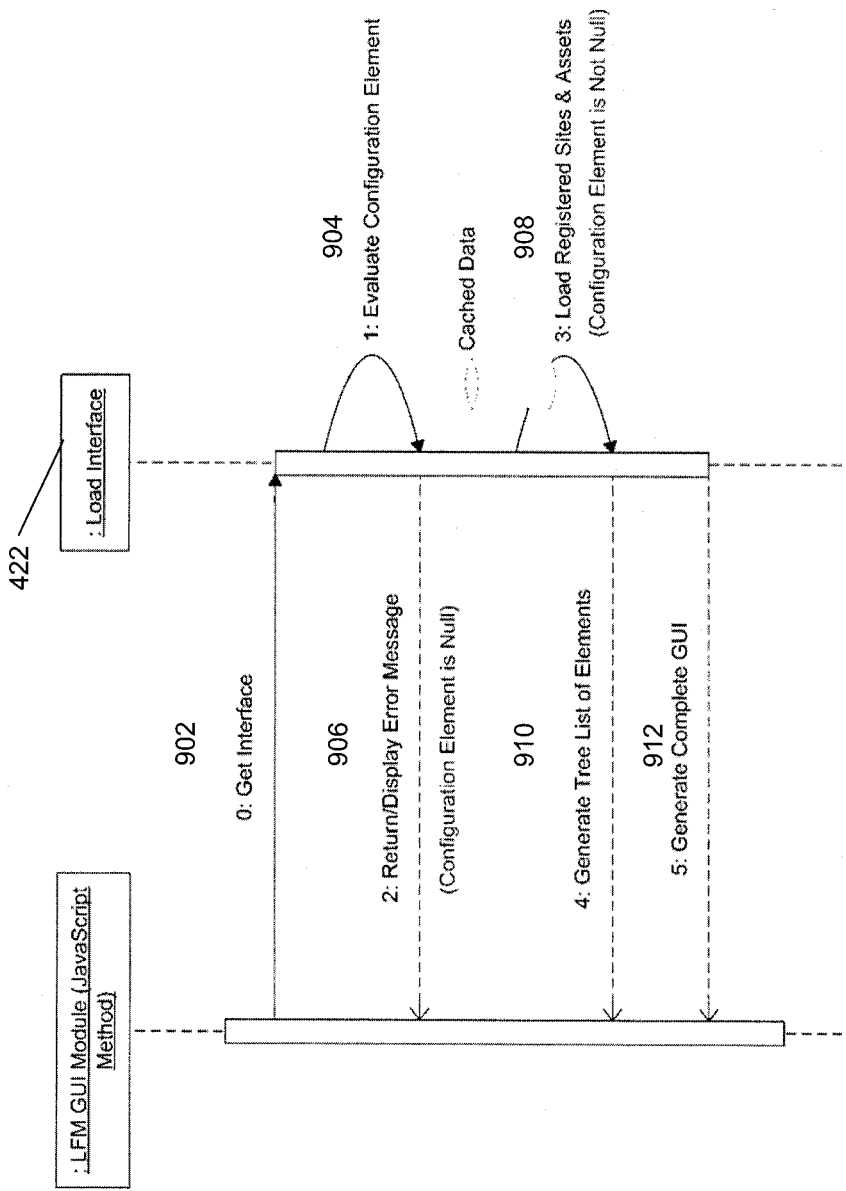
FIG. 9 is a messaging diagram illustrating a method for loading an asset browser in a graphical user interface in accordance with one embodiment of the present invention.

FIG. 9 is a messaging diagram illustrating a method for loading an asset browser 450 of a graphical user interface (see, e.g., asset browser 450 in FIG. 7) in accordance with one embodiment of the present invention. As shown in FIG. 9, a request to get a user interface is sent to the graphical user interface component 422 of the user interface server 42 in step 902. The request includes a configuration element such as the user type determined as described above. The configuration element is evaluated in step 904. If the supplied configuration element is null, then an error message is displayed in step 906. If the configuration element is not null, then registered sites and assets corresponding to the configuration element are loaded in step 908. For example, if the user type is a customer, only the sites and assets controlled by that customer are loaded from a cache. If the user type is a customer support agent, the sites and assets assigned to that customer support agent are loaded from the cache. The list of registered sites and assets is used to generate a tree list of elements (e.g., assets are placed within the branches of their corresponding sites) in step 910, and the asset browser 450 portion of the user interface is generated in step 912.

Figure 10:
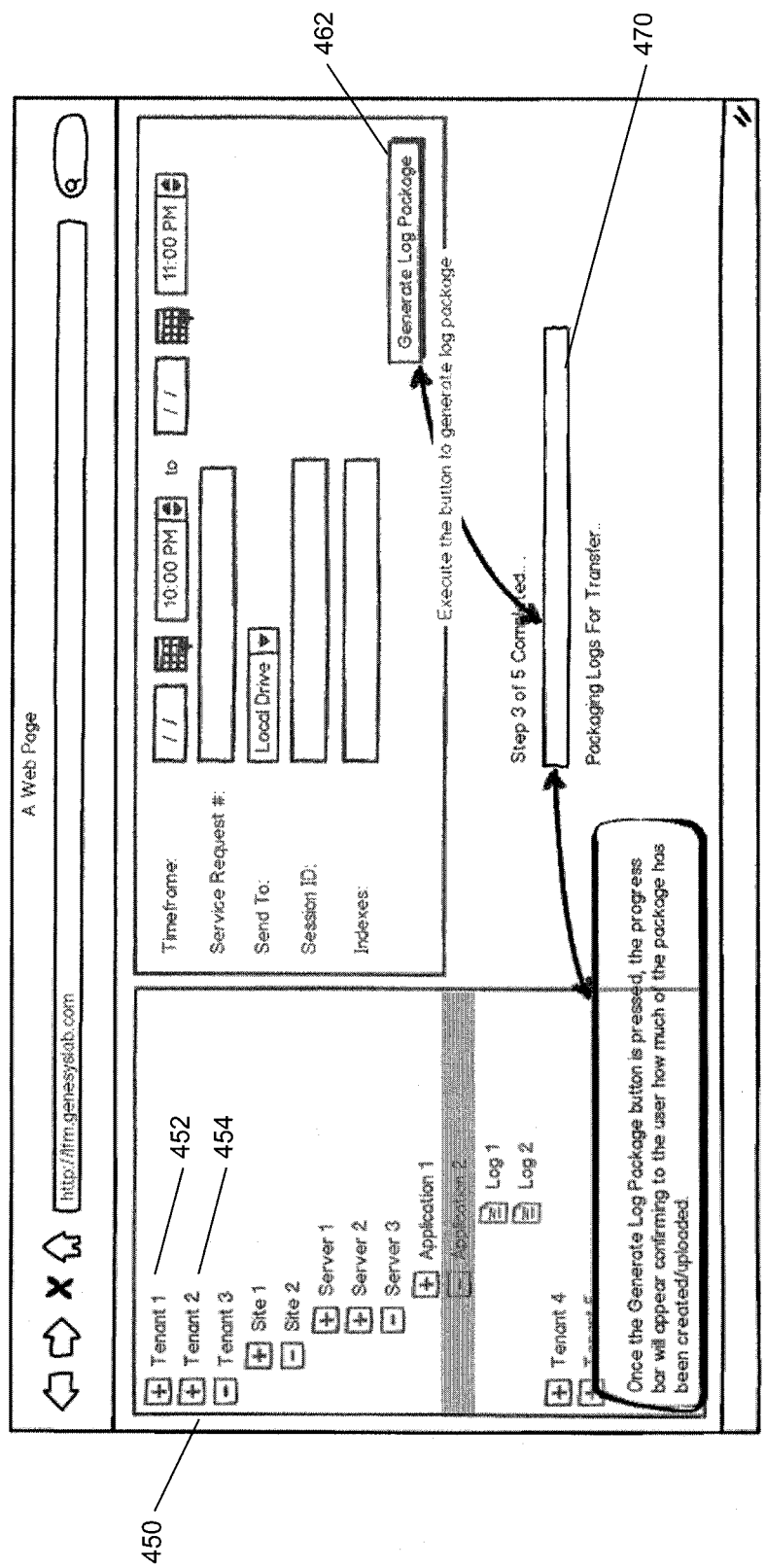
FIG. 10 is a screenshot of a user interface illustrating a progress bar showing the progress of packaging a requested set of logs for transfer according to one embodiment of the present invention.

FIG. 10 is a screenshot of a user interface illustrating a progress bar 470 showing the progress of packaging a requested set of logs for transfer according to one embodiment of the present invention. FIG. 10 is substantially similar to the screenshot shown in FIG. 7 and descriptions of substantially similar components having similar reference numerals will not be repeated herein. After a user has submitted a request for logs by clicking on the "Generate Log Package" button 462, the progress bar 470 is displayed to confirm to the user how much of the log package has been created and/or uploaded. The progress bar 470 also includes text indicating the number of steps completed and a verbal description of the operation currently being performed.

Figure 11:
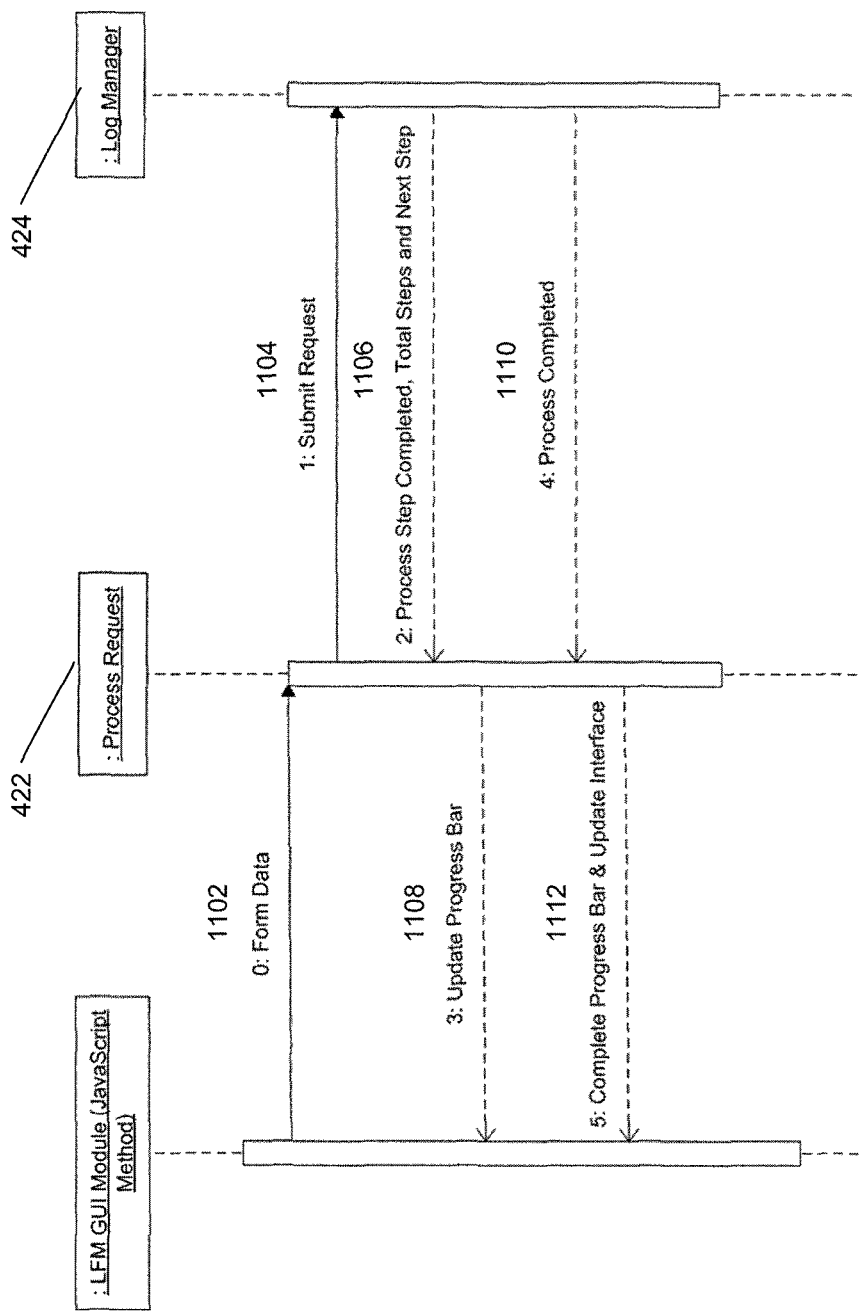
FIG. 11 is a messaging diagram illustrating a method for submitting a request and receiving progress information regarding the progress of packaging a requested set of logs for transfer according to one embodiment of the present invention.

FIG. 11 is a messaging diagram illustrating a method for submitting a request and receiving progress information regarding the progress of packaging a requested set of logs for transfer according to one embodiment of the present invention. In step 1102, the form data is sent to the graphical user interface component 422 of the user interface server 42. According to one embodiment, the received form data is converted into a different format (e.g., an XML document or a JSON message) and submitted to the log manager 424 in step 1104. In step 1106, information regarding the current progress of the packaging operation (such as processes step completed, the total number of steps and the next step) is sent to the graphical user interface component 422 of the user interface server 42, and a message is sent to update the progress bar on the user interface in step 1108. Steps 1106 and 1108 are repeated throughout the packaging operation until it is complete. When the process is complete, a message is sent to the graphical user interface component 422 of the user interface server 42 in step 1110 and the completion of the operation is reported to the user interface in step 1112. The logs may be packaged into a single archive file, such as a .zip file or a .tar file or other data container conventional in the art.

Figure 12:
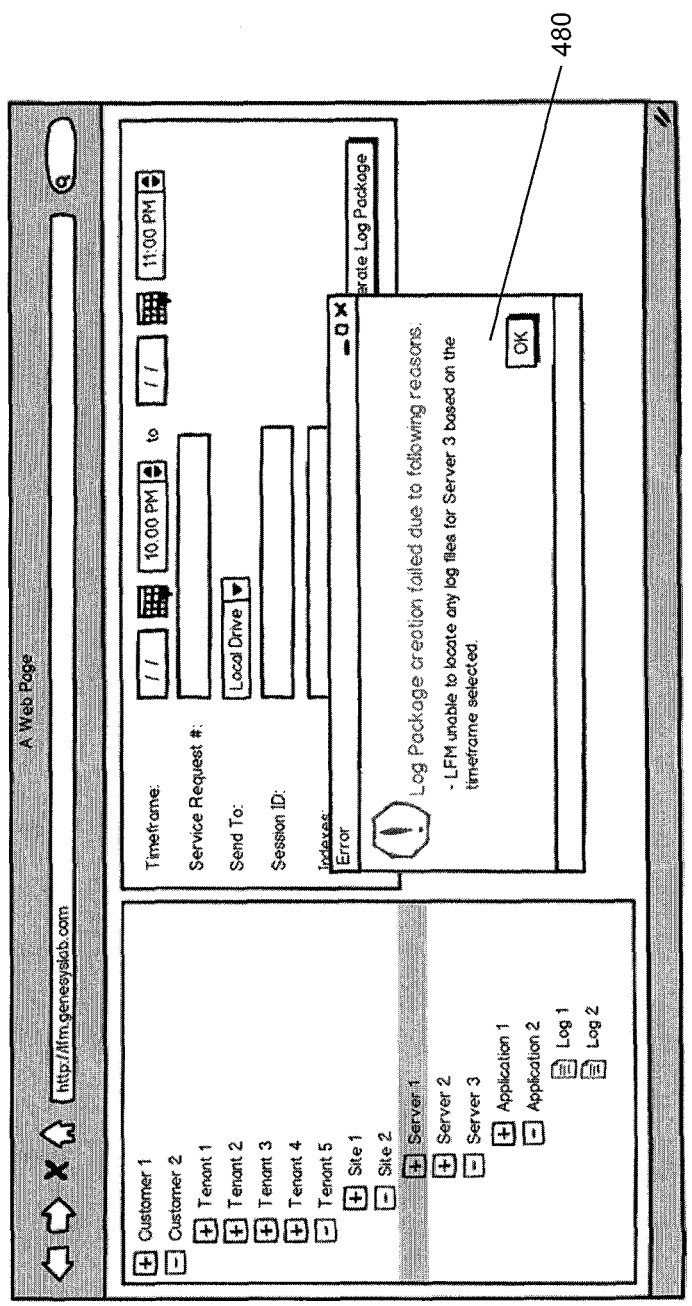
FIG. 12 is a screenshot of a user interface showing a log package creation failure in accordance with one embodiment of the present invention.

FIG. 12 is a screenshot of a user interface showing a log package creation failure in accordance with one embodiment of the present invention. The completion message sent in step 1110 as described in reference to FIG. 11 is also used to indicate that the log package creation process failed and to report the reason for the failure. This failure status is displayed on the user interface as an error dialog box 480.

Figure 13:
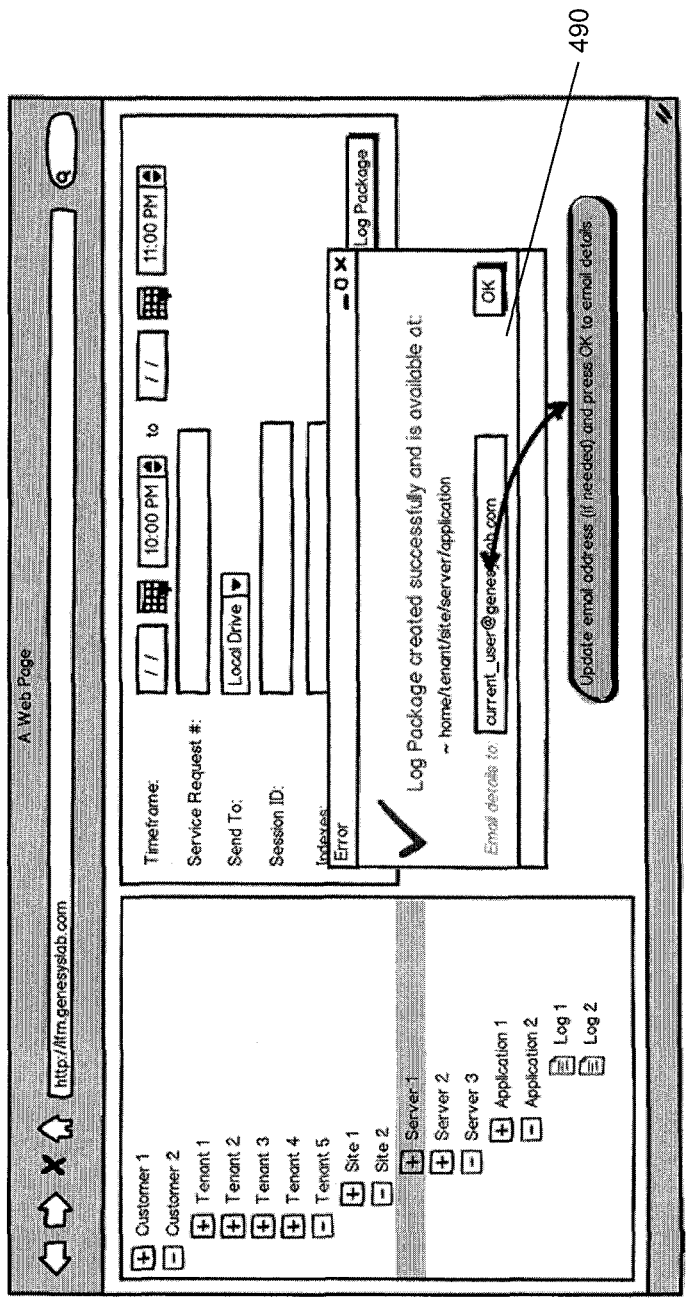
FIG. 13 is a screenshot of a user interface showing a log package creation success in accordance with one embodiment of the present invention.

FIG. 13 is a screenshot of a user interface showing a log package creation success in accordance with one embodiment of the present invention. The completion message sent in step 1110 as described in reference to FIG. 11 is used to indicate that the log package creation process succeeded and a message reporting the success is displayed in a dialog box 490. The dialog box includes information such as a path to a location where the log is saved and an option to email details of the log creation process to an email address. The successfully packaged logs may be sent to a support agent to review the contents of the logs, which can be displayed on the support agent's computer.

Figure 14:
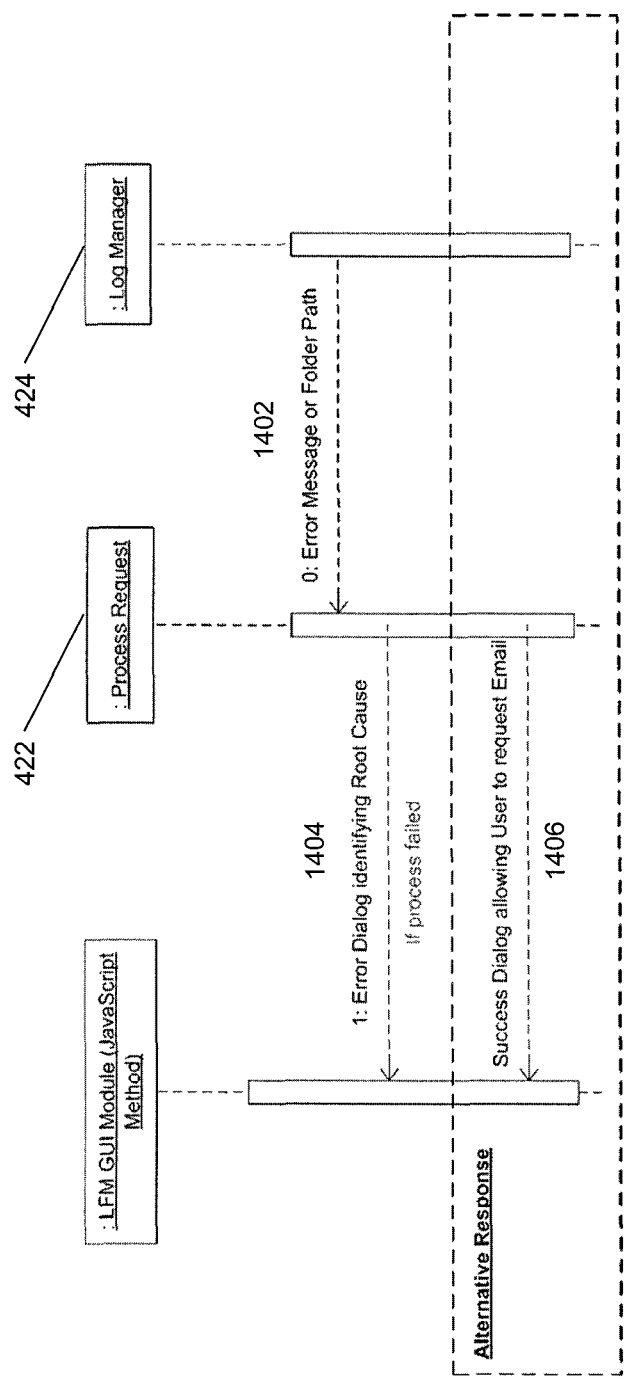
FIG. 14 is a messaging diagram illustrating a process of sending messages to a user interface to indicate success or failure in packaging a requested set of logs in accordance with one embodiment of the present invention.

FIG. 14 is a messaging diagram illustrating a process of sending messages to a user interface to indicate success or failure in packaging a requested set of logs in accordance with one embodiment of the present invention. When the log manager detects that the process of creating the log package is complete, it sends an error message or a path to the graphical user interface component 422 of the user interface server 42 in step 1402. If an error occurred, in step 1404 the graphical user interface component 422 sends a message to generate an error dialog as shown, for example, in FIG. 12. If the log package creation process succeeded, then in step 1406 the graphical user interface component 422 sends a message to generate a success dialog as shown, for example, in FIG. 13.

Figure 15:
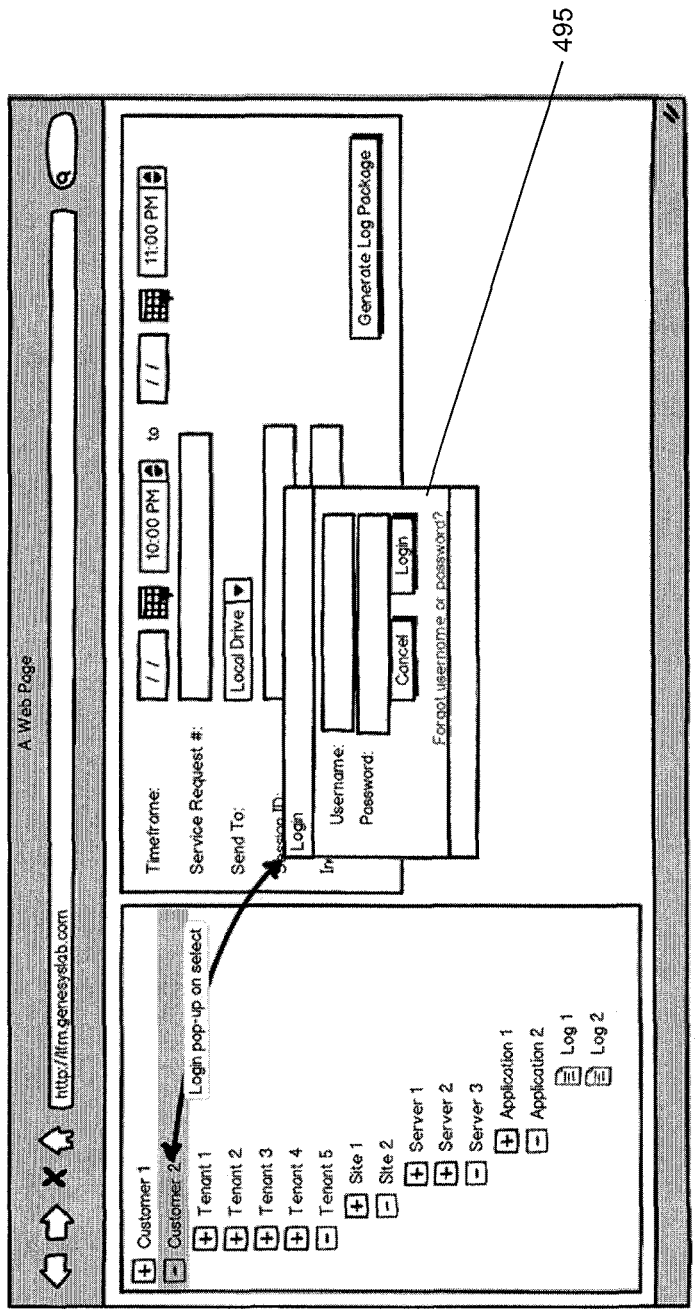
FIG. 15 is a screenshot illustrating a prompt for user login credentials for accessing the logs associated with a customer site in accordance with one embodiment of the present invention.

FIG. 15 is a screenshot illustrating a prompt for user login credentials for accessing the logs associated with a customer site in accordance with one embodiment of the present invention. As discussed above with respect to FIG. 8, the user logged into the system may access assets associated with a particular set of customer sites. In some embodiments, access to various assets is further restricted by requiring a user to supply login credentials (e.g., a username and password) for particular customer sites. As shown in FIG. 15, a login dialog box 495 is displayed to prompt a user for login credentials when the user attempts to access logs associated with the "Customer 2" customer site when the user is not logged in or has not already supplied login credentials for the selected assets.

Figure 16:
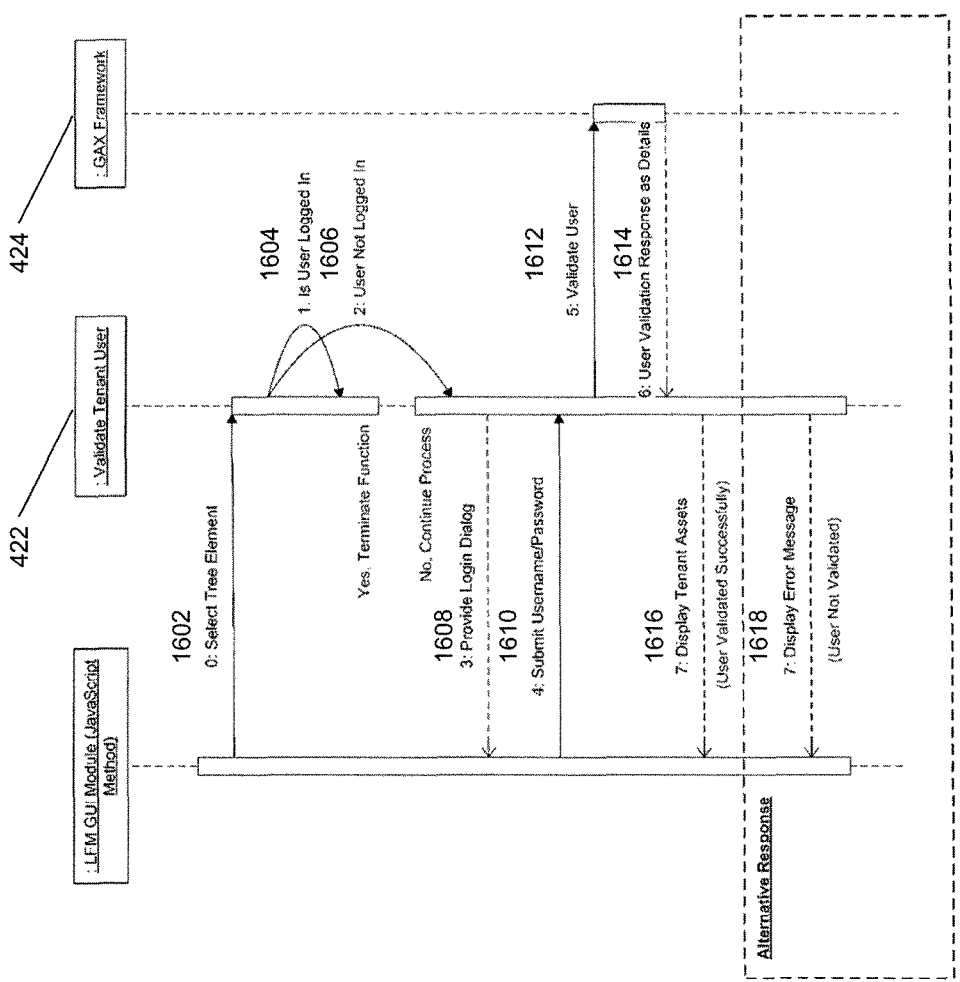
FIG. 16 is a messaging diagram illustrating a process of validating a user for access to a set of logs in accordance with one embodiment of the present invention.

FIG. 16 is a messaging diagram illustrating a process of validating a user for access to a set of logs in accordance with one embodiment of the present invention. Initially, when a user attempts to select a tree element, a request for that element is generated in step 1602. The logging user interface server 42 determines whether the user is logged in (e.g., whether the user has supplied login credentials for the selected tree element). If the user is logged in, then the operation terminates in step 1604 and returns the requested data. If the logging user interface server 42 determines in step 1606 that that the user is not logged in, then a message is sent back to the browser to provide a login dialog in step 1608. The logging user interface server 42 then receives a set of login credentials (username and password) in step 1610 and validates the user in step 1612. A validation response received in step 1614 is then used to determine whether to display the requested assets in step 1616 (if the validation was successful) or to display an error message in step 1618 (if the validation failed).

Figure 17:
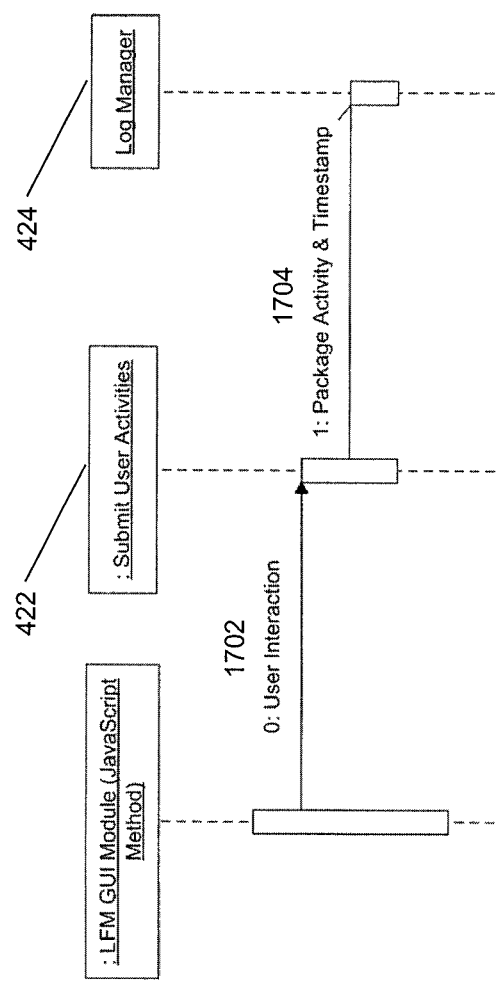
FIG. 17 is a messaging diagram illustrating a method for submitting user activities through asynchronous calls in accordance with one embodiment of the present invention.

FIG. 17 is a messaging diagram illustrating a method for submitting user activities through asynchronous calls in accordance with one embodiment of the present invention, where actions taken by a user within the logging user interface are also logged and stored. For example, activities such as the selection of tenants and other elements, recording of log package criteria, and submitting log package requests are logged by the system to identify the user and time of the activities conducted. As shown in FIG. 17, when the logging user interface server 42 receives a command from the user in step 1702, the commands (or activities) are recorded and timestamped in step 1704 and stored by the log manager 424.

Figure 18:
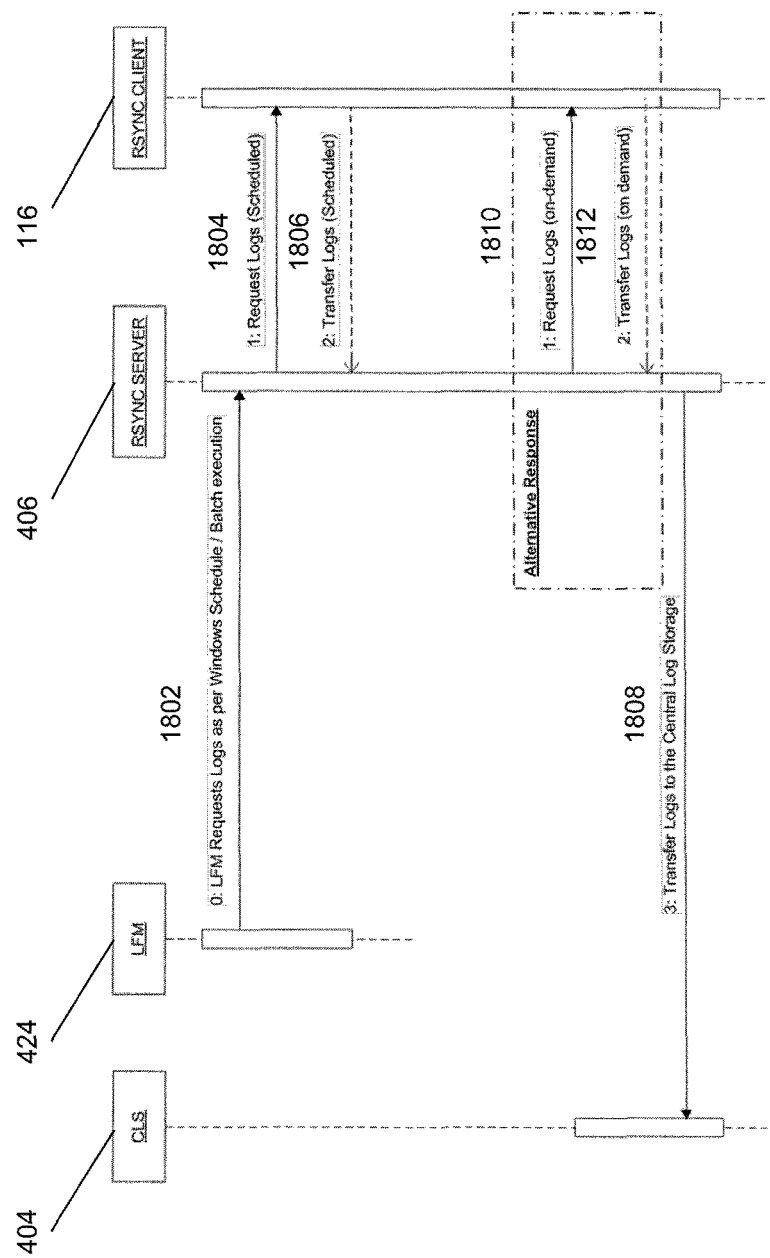
FIG. 18 is a messaging diagram illustrating a messages exchanged between a logging server, an application server, a log manager, and a central log storage repository during a scheduled or on-demand transfer of logs from the application server to the central log storage repository according to one embodiment of the present invention.

FIG. 18 is a messaging diagram illustrating a messages exchanged between the logging server 40, the application server 110, the log manager 424, and the central log storage repository 404 during a scheduled or on-demand transfer of logs from the application server 110 to the central log storage repository 404 according to one embodiment of the present invention. In general log retrieval may be initiated based on a schedule (e.g., Microsoft Windows® Task Scheduler on when using Windows® or a cron job when using Linux) or on an on-demand basis (as triggered by a user). The frequency with which logs are retrieved is configurable on a per application (e.g., application or applications 112) basis and may be set based on a number of factors including: the rate at which log files on the application servers 110 are overwritten by new logs; the rate at which the log files on the application servers 110 grow; and the frequency with which errors typically occur in the application servers 110.

Initially, the log manager 424 sends a request for logs to the logging server 40 in accordance with a schedule in step 1802. The logging server 40 (the log retriever program 406) sends a request to the application server 110 (the log transmission program 116) for logs in step 1804. The log transmission program 116 returns the requested logs to the logging server 40 in step 1806 and the received logs are transferred to the central log storage repository 404. Alternatively, the log transfer may be triggered by an on-demand request received from the log manager 424, in which an on-demand request for logs is sent from the logging server 40 to the application server 110 in steps 1810 and 1812.

Figure 19:
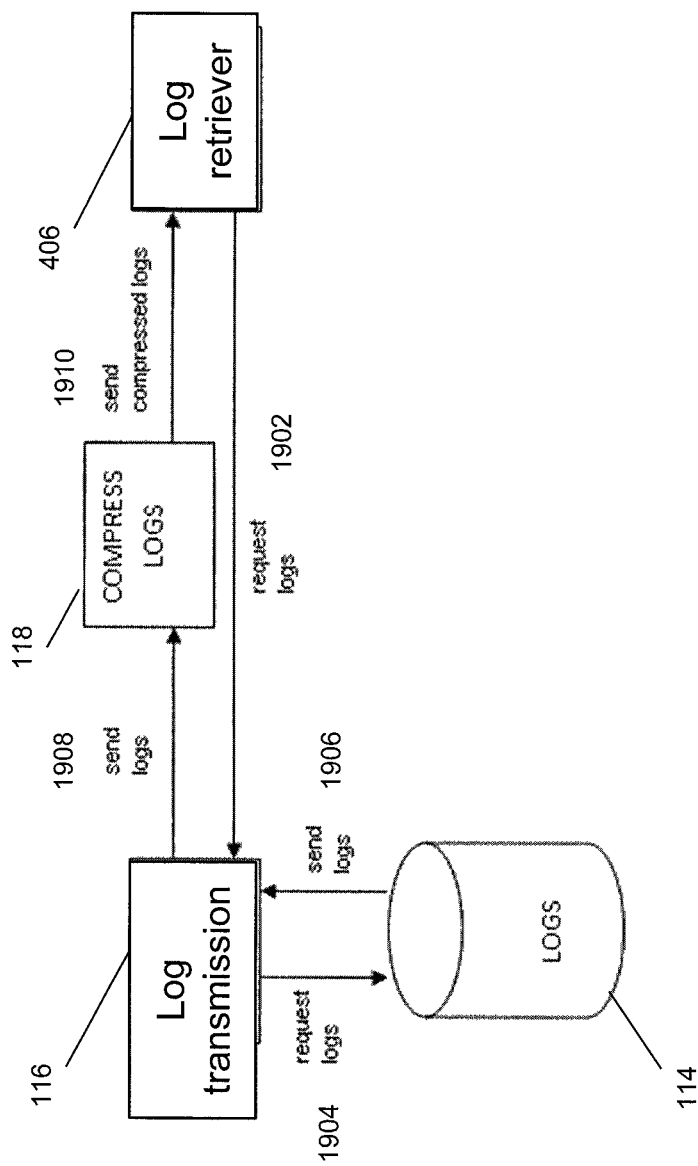
FIG. 19 is a schematic block diagram of components involved in the compression and transfer of logs to a logging server in accordance with one embodiment of the present invention.
Figure 20A:
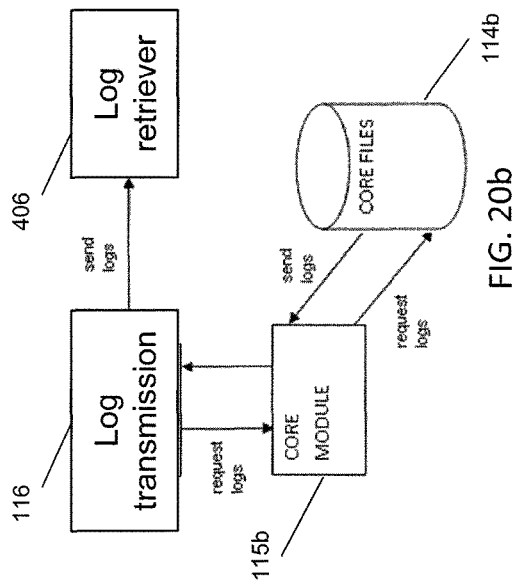
FIGS. 20a, 20b, 20c, and 20d are schematic block diagrams illustrating components involved in the sending of logs from various log sources according to one embodiment of the present invention.
Figure 20B:
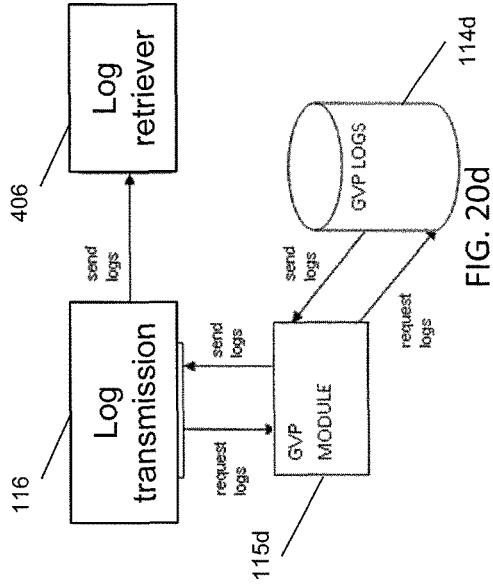
Figure 20C:
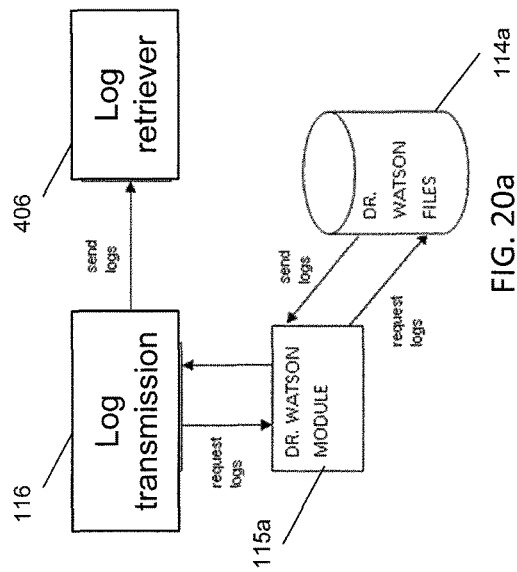
Figure 20D:
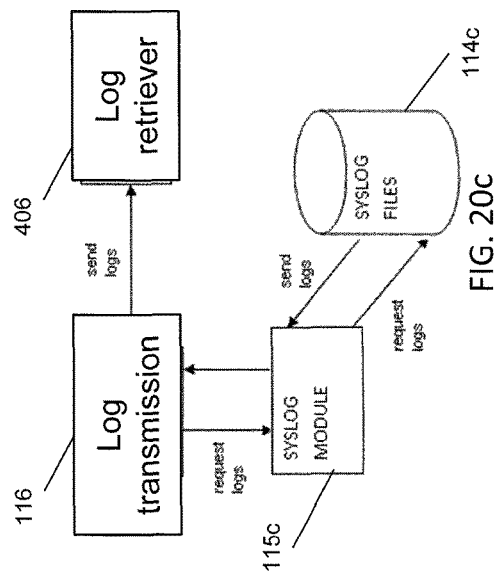

FIG. 19 is a schematic block diagram of components involved in the compression and transfer of logs to a logging server in accordance with one embodiment of the present invention. A request for logs may be transmitted from the log retriever program 406 to the log transmission program 116 in step 1902. In step 1904, the log transmission program 116 requests logs stored on the storage device 114 and logs are retrieved in step 1906. The logs are then sent for compression by the log compressor 118 in step 1908 and the compressed logs are sent to the log retriever 406 in step 1910.

FIGS. 20a, 20b, 20c, and 20d are schematic block diagrams illustrating components involved in the sending of logs from various log sources according to one embodiment of the present invention. As described above in reference to FIG. 5, logs stored on the storage device 114 of the application server 110 may be transmitted by the log transmission program 116 to the log retriever 406. Log files from different software applications running on the application servers 110 may generate logs in a variety of different formats and stored in a variety of locations. As such, in one embodiment, a logging module is supplied for each type of application 112. For example a "Dr. Watson" logging module 115a is used to request and send Dr. Watson files 114a on a Windows-based server. As another example, a "core" logging module 115b is used to request and send core dumps 114b and a "syslog" module 115c is used to request and send syslog files 114c in a Unix based system. Custom modules 115d may also be written for other types of applications storing custom logs 114d (e.g., Apache Tomcat, Microsoft® IIS, rsync transfer logs, etc.).

Figure 21:
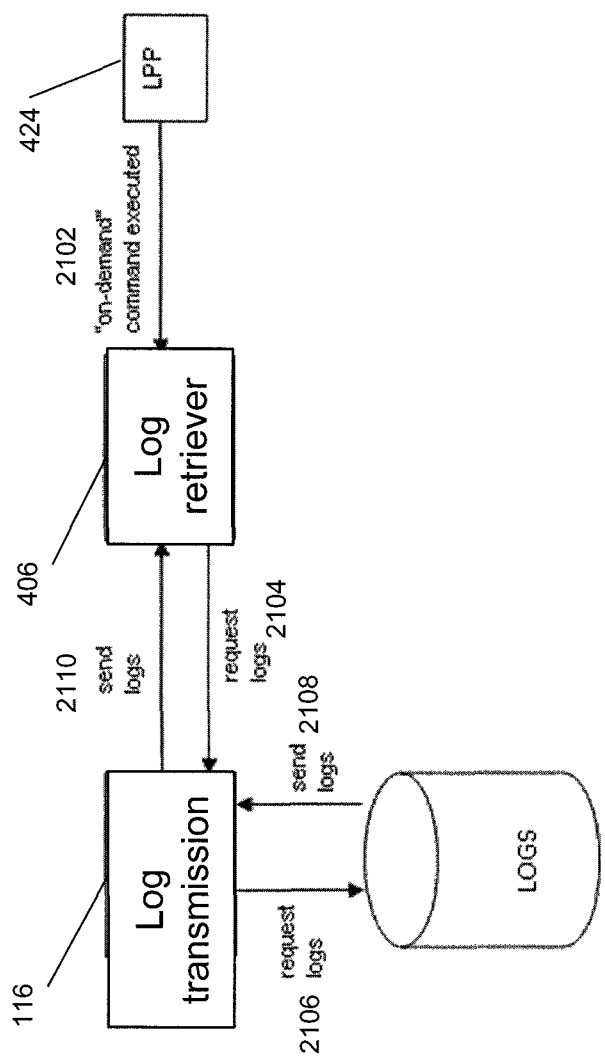
FIG. 21 is a schematic block diagram illustrating components involved in responding to an "on-demand" request for logs according to one embodiment of the present invention.

FIG. 21 is a schematic block diagram illustrating components involved in responding to an "on-demand" request for logs according to one embodiment of the present invention. In some embodiments, logs may be retrieved from an application server 110 "on-demand" such that the newest logs are retrieved and stored, without waiting the next scheduled retrieval of logs. The log manager 424 sends a message to synchronize the logs "on-demand" in step 2102. the log retriever 406 then sends a request for logs in step 2104 to the log transmission program 116, which then requests the logs from the storage device in step 2106. The retrieved logs are then sent to the log transmission program in step 2108 and the logs are sent to the log retriever 406 for storage in step 2110.

Figure 22:
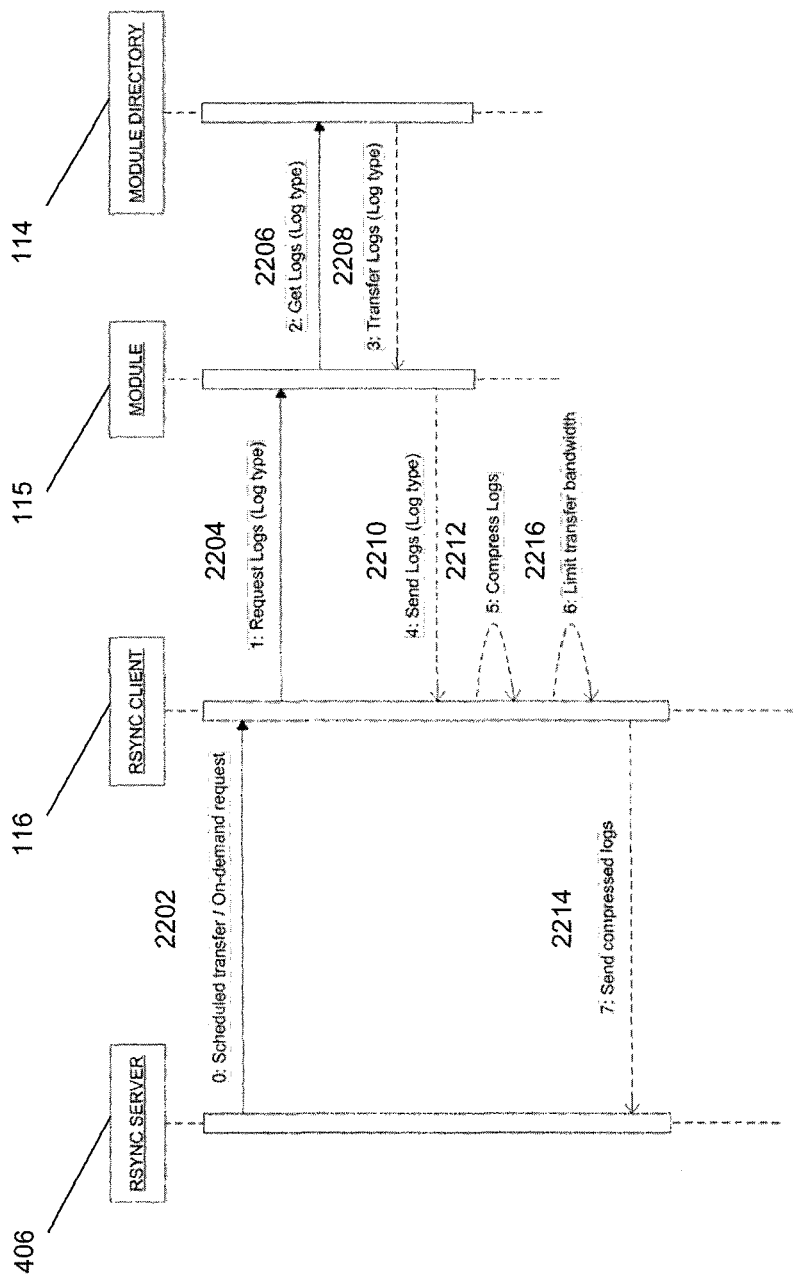
FIG. 22 is a messaging diagram illustrating a sequence of messages that are exchanged when requesting logs from an application server according to one embodiment of the present invention.

FIG. 22 is a messaging diagram illustrating a sequence of messages that are exchanged when requesting logs from an application server 110 according to one embodiment of the present invention. The log retriever 406 sends a request for logs (e.g., a scheduled transfer or an on-demand transfer) in step 2202. The log transmission program 116 receives the request and requests logs via the logging module 115 in step 2204. In step 2206, the logging module 115 retrieves the requested logs from the storage device 114 (e.g., a particular directory in the storage device). In step 2208, the requested logs are transferred to the logging module 115, and the logs are sent to the log transmission program 116 in step 2210. The logs may then be compressed by the log transmission program in step 2212. The logs (or compressed logs) are then transmitted to the log retriever 406 in step 2214. In some embodiments, a data transfer bandwidth limit is set in step 2216 prior to transmitting the logs in step 2214.

Figure 23:
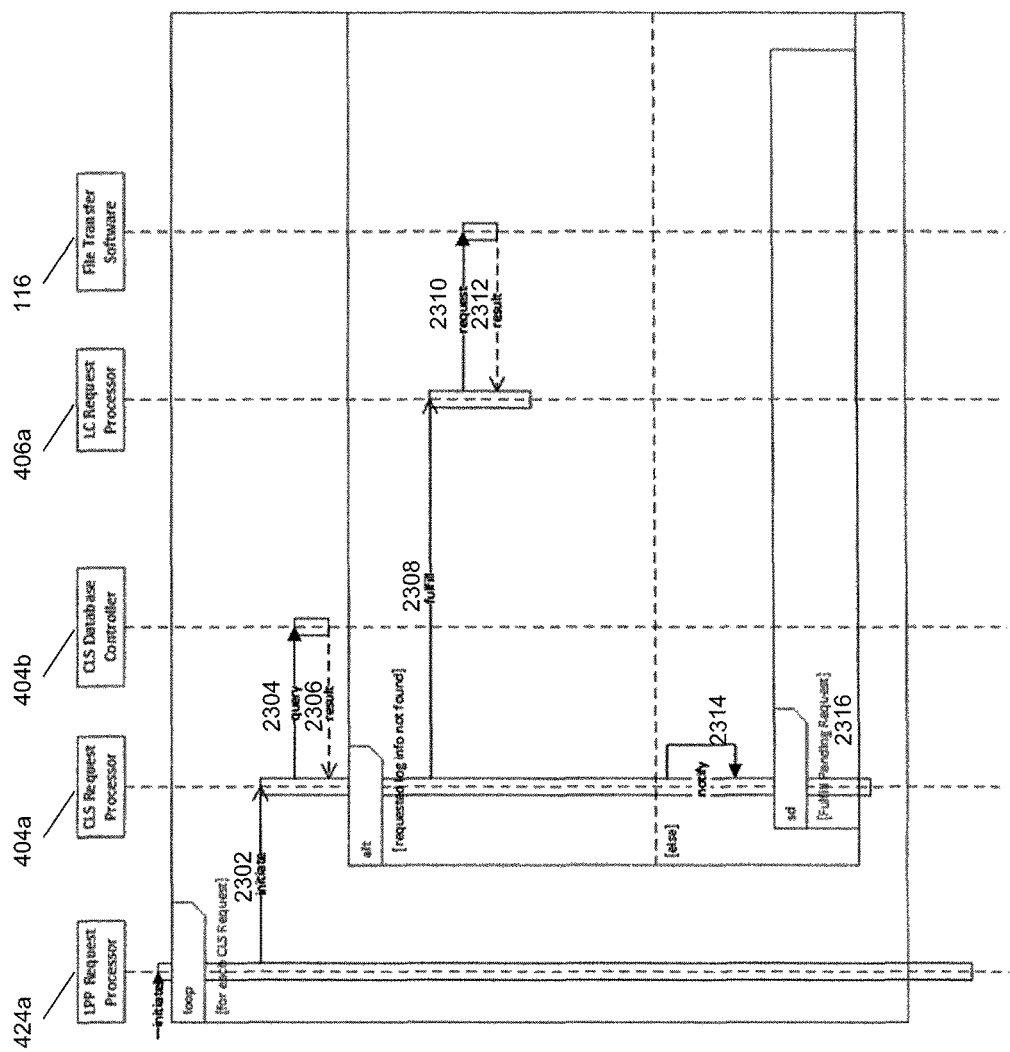
FIG. 23 is a messaging diagram illustrating a sequence of messages exchanged when submitting a request for a set of log files to the central log storage repository according to one embodiment of the present invention.

FIG. 23 is a messaging diagram illustrating a sequence of messages exchanged when submitting a request for a set of log files to the central log storage repository according to one embodiment of the present invention. When a central log storage request processor 404a receives a request for logs is received from a user interface in step 2302, it queries the central log storage database controller 404b for the requested logs in step 2304 and receives a result of the query in step 2306. If the requested logs are found, then the request is fulfilled by supplying the logs to the requestor in step 2316. If the logs are not found, then a fulfill request is sent to a log retriever request processor (or log collector request processor) 406a of the log retriever 406 in step 2308. The logs are then requested using file transfer software (e.g., the log retriever 406 and log transmission program 116) in step 2310 and the logs are returned in step 2312. The retrieved logs are then used to fulfill the pending request in step 2316.

In some instances the request for logs includes the name of an offending application 112 that is exhibiting problems. Due to the interdependency of modern software systems in which different applications running on different physical hardware rely on services provided to one another, it is often necessary to collect logs generated by multiple software applications running on multiple application servers to diagnose the underlying cause of the problem. As such, according to embodiments of the present invention, logs from applications and services related to the named offending application 112 may also be packaged with the requested logs.

As described above, the configuration server 130 manages and tracks the configuration of applications running on the application servers 110, where the configuration information includes the interrelationships and interdependencies of applications running on those servers. For example, if an error appears to be occurring in a web based user interface component, the configuration server 130 would include information about which physical application servers 110 are involved in providing that user interface, and the particular instances of the application framework (e.g., Spring), the underlying web server (e.g., Apache Tomcat), and database instances (e.g., MySQL®) supporting the user interface. Based on the configuration information retrieved from the configuration server 130, the logging server 40 may retrieve and package system level error logs from those application servers 110 as well as logs from other software in the stack that supports the named offending application 112. For example, in one embodiment, the logging server loads the relationship graph corresponding to the offending application 112 and traverses the relationship graph to identify the related applications.

Figure 24:
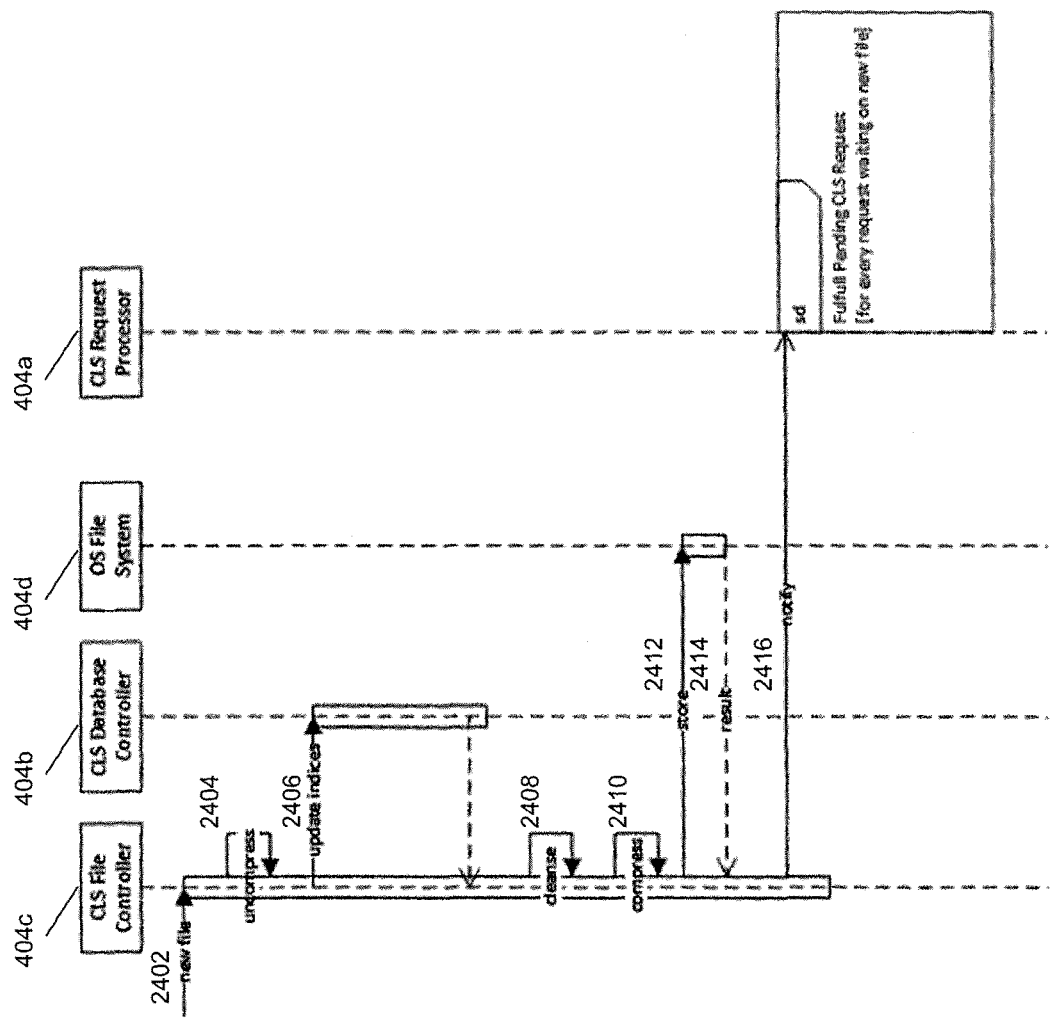
FIG. 24 is a messaging diagram illustrating a process of storing a newly received log file in a central log storage repository according to one embodiment of the present invention.

FIG. 24 is a messaging diagram illustrating a process of storing a newly received log file in a central log storage repository according to one embodiment of the present invention. A central log storage repository file controller 404c receives a new log file in step 2402. If the new log file is compressed, then the file is decompressed in step 2404. The log file is then indexed by the log indexer 408 and the indices (or indexes) stored in the index database 410 are updated in step 2406. The log file many be indexed to store keywords, session identifiers, timestamps, and other aspects so that the log files are searchable and filterable.

In some embodiments, the log file is also cleansed in step 2408 to remove sensitive information such as personal information, medical information, and other data that might not be relevant to diagnosing problems that arise in the system. In one embodiment, the log files are cleansed by redacting the sensitive information by covering the data with dummy characters (e.g., strings of "X").

The log file may then be compressed in step 2410 and then stored on disk 404d (e.g., on the underlying file system) in step 2412. Successful storage of the information is reported in step 2414 and the central log storage repository file controller 404c notifies the central log storage repository request processor 404a that the request to store the new log file is complete.

The newly received logs may be stored in the file system 404d without deleting prior logs. For example, a separate directory with a timestamp or sequence number may be used to store new logs in the file system 404d or the log files may be renamed to include a timestamp or sequence number corresponding to their collection time. In some embodiments, space within the file system of the central log storage repository may be conserved by storing only differences between the new log file and the prior log files (e.g., calculating the differences between the file using the rdiff program).

Total space used in the file system 404d may be limited by restricting the history length of the stored logs. For example, the central log storage repository may be configured to periodically purge log files older than a set time period (e.g., one week, two weeks, one month, six months, or more).

Figure 25:
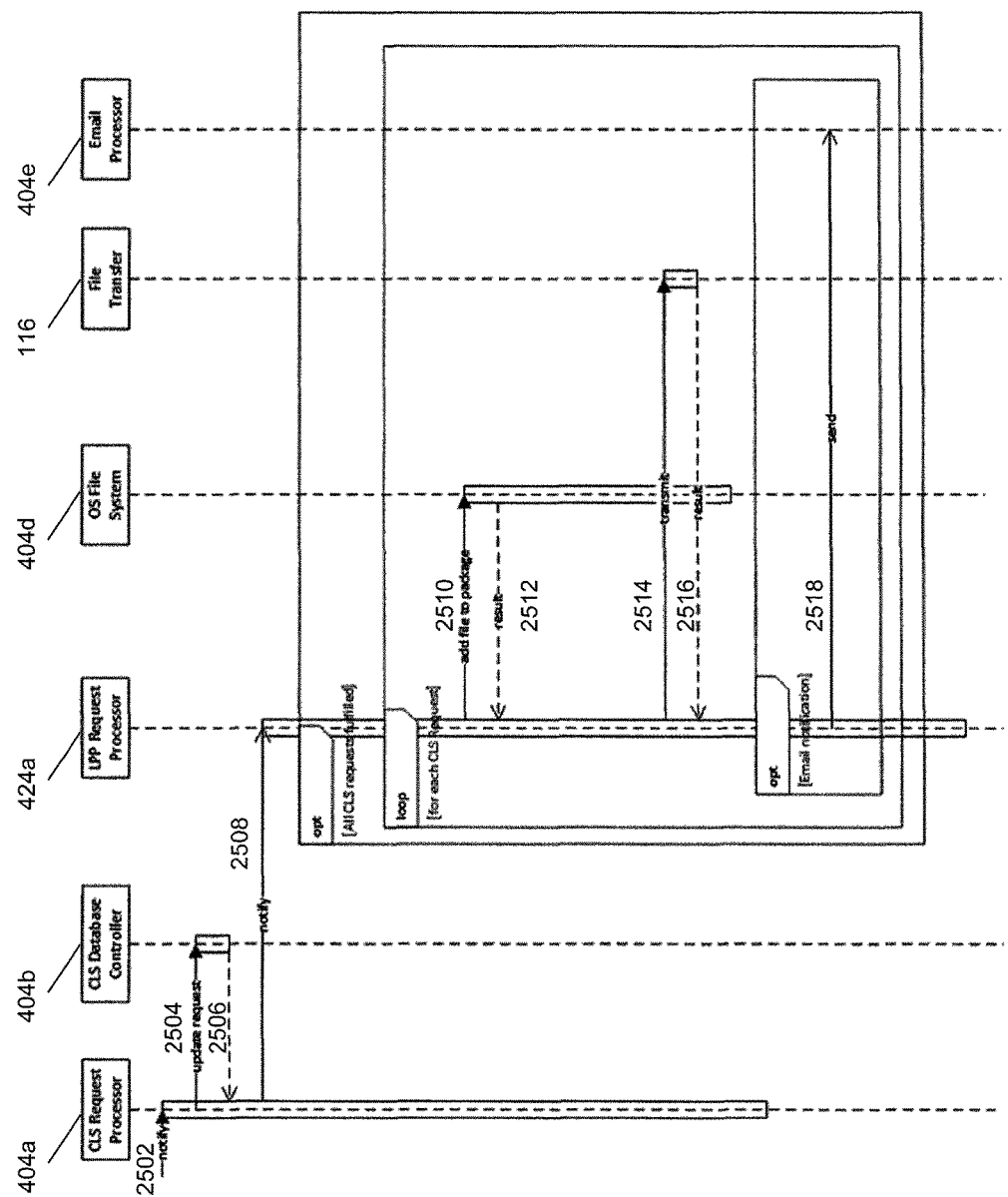
FIG. 25 is a messaging diagram illustrating a process of fulfilling a pending request for logs according to one embodiment of the present invention.

FIG. 25 is a messaging diagram illustrating a process of fulfilling a pending request for logs according to one embodiment of the present invention. The central log storage request processor 404a receives a request in step 2502 and updates the status of the request in step 2504. After the request has been updated in step 2506, the central log storage request processor 404a notifies the log manager request processor 424a of the request in step 2508. The log manager request processor 424a then iterates through all of the files to be retrieved and requests that file from the storage device (e.g., the file system 404d stored on a storage device of the central log storage repository) in step 2510 and receives the retrieved log in step 2512. Each file is also transferred using the file transfer software 116 in step 2514 and the result of the transfer (e.g., success or failure) is reported in step 2516. Optionally, an email notification of the completion of the log file reporting process may be sent in step 2518 using an email processor 404e.

Figure 26:
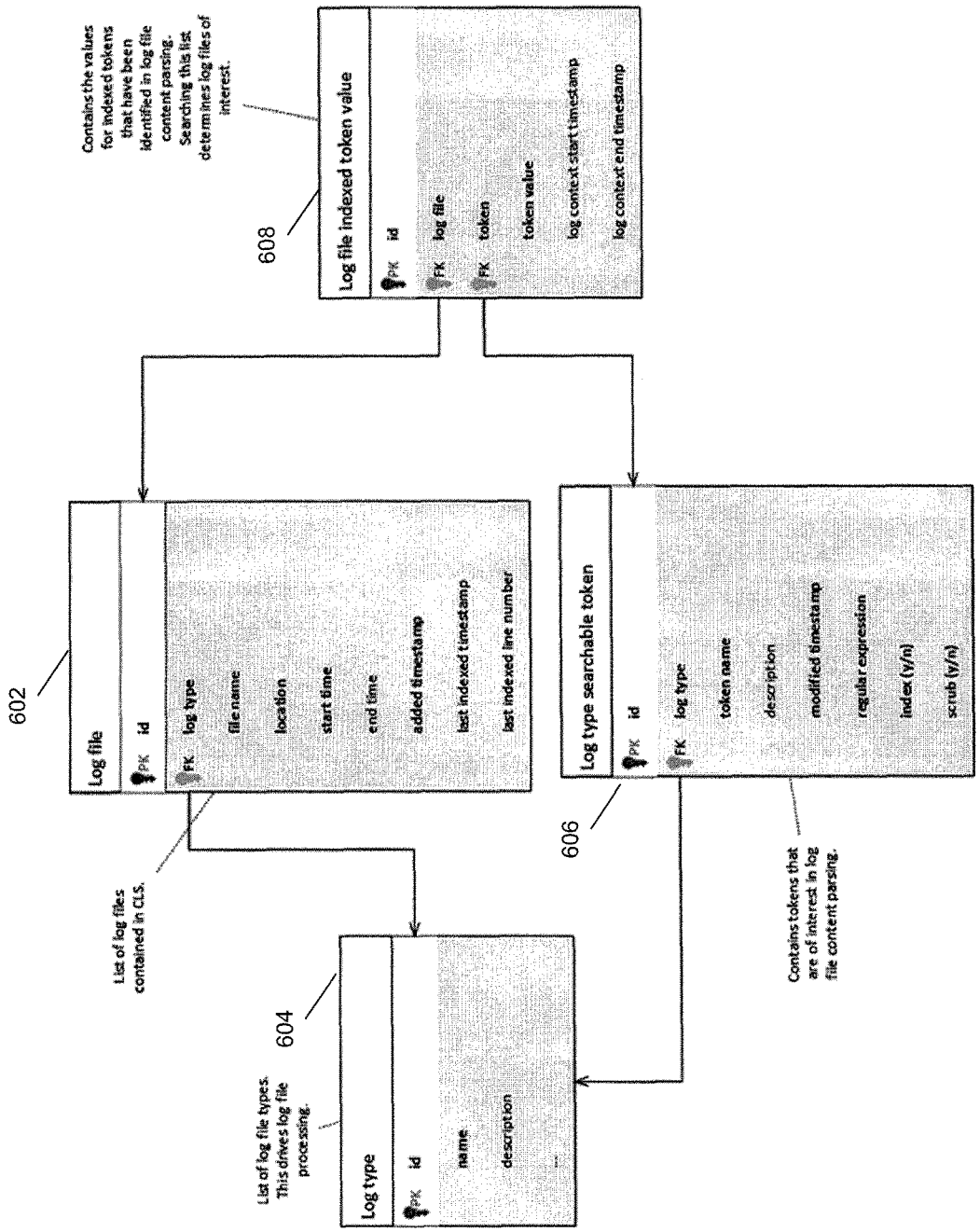
FIG. 26 is a data model diagram illustrating the relationships of entities in a data model used by a log manager according to one embodiment of the present invention.

FIG. 26 is a data model diagram illustrating the relationships of entities in a data model used by a log manager according to one embodiment of the present invention. The "log file" datatype 602 contains attributes of the log files that have been processed and stored in the central log storage repository. The "log type" datatype 604 allows log files to be categorized. The "log type searchable token" datatype 606 lists elements in the file content that might be relevant for each type of log file because the associated content might be: (i) of a sensitive or private nature and must be "scrubbed" or "cleaned" or (ii) may be used as the basis of identifying log files of interest; this data type is used to drive the log file parsing and indexing process to assist in identifying items of interest to be indexed or cleaned. The "log file indexed token value" datatype 608 is populated by the log file parsing activity and contains the log file content associated with each token found during parsing of that log file.

Figure 27:
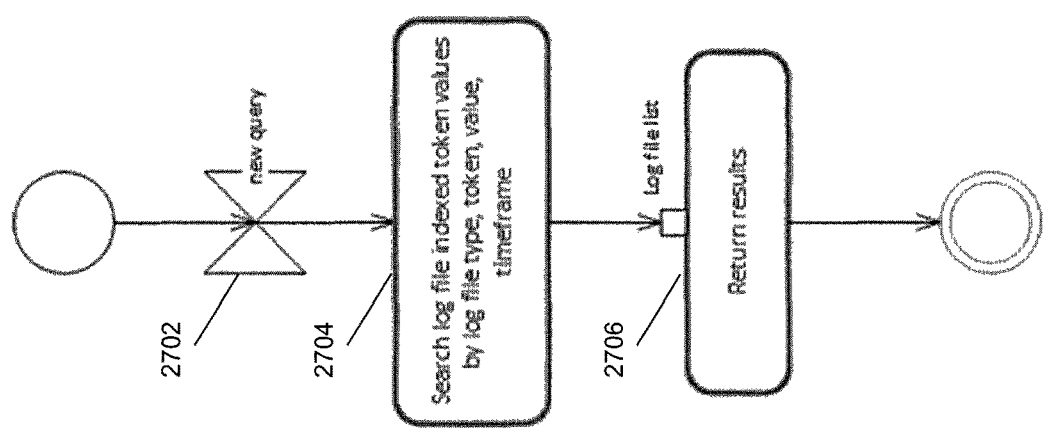
FIG. 27 is a flowchart illustrating a method for searching an indexed log file according to one embodiment of the present invention.

FIG. 27 is a flowchart illustrating a method for searching an indexed log file according to one embodiment of the present invention. A new query is received in step 2702, where the query includes parameters as the criteria for searching the indexed token values. The log file indexed token values are searched in step 2704 and the result of the search is a list of log files that contain the specified token-value pair(s), which is returned in step 2706. Token values may be specified when building the request using, for example, the request builder 460 described above in reference to FIG. 7. Types of token values include session identifiers, keywords to search for in the indexes, error messages, error codes, issue types, log file types, and file names. According to one embodiment, the token-value pairs are extracted using regular expressions.

In addition to searching for logs matching criteria as described above, portions of the logs returned in the log list may be filtered based on criteria such as log level, file name, error message, error code, session identifier, and keyword. For example, the filter may be set to only return lines of logs having a level equal to or above a particular level and/or only return lines containing a particular error code.

According to one embodiment, when a customer support agent opens and displays a log file from a package, and keywords other criteria that were used to filter the logs may also be heighted to ease identification of the matching portions of the logs.

Figure 28:
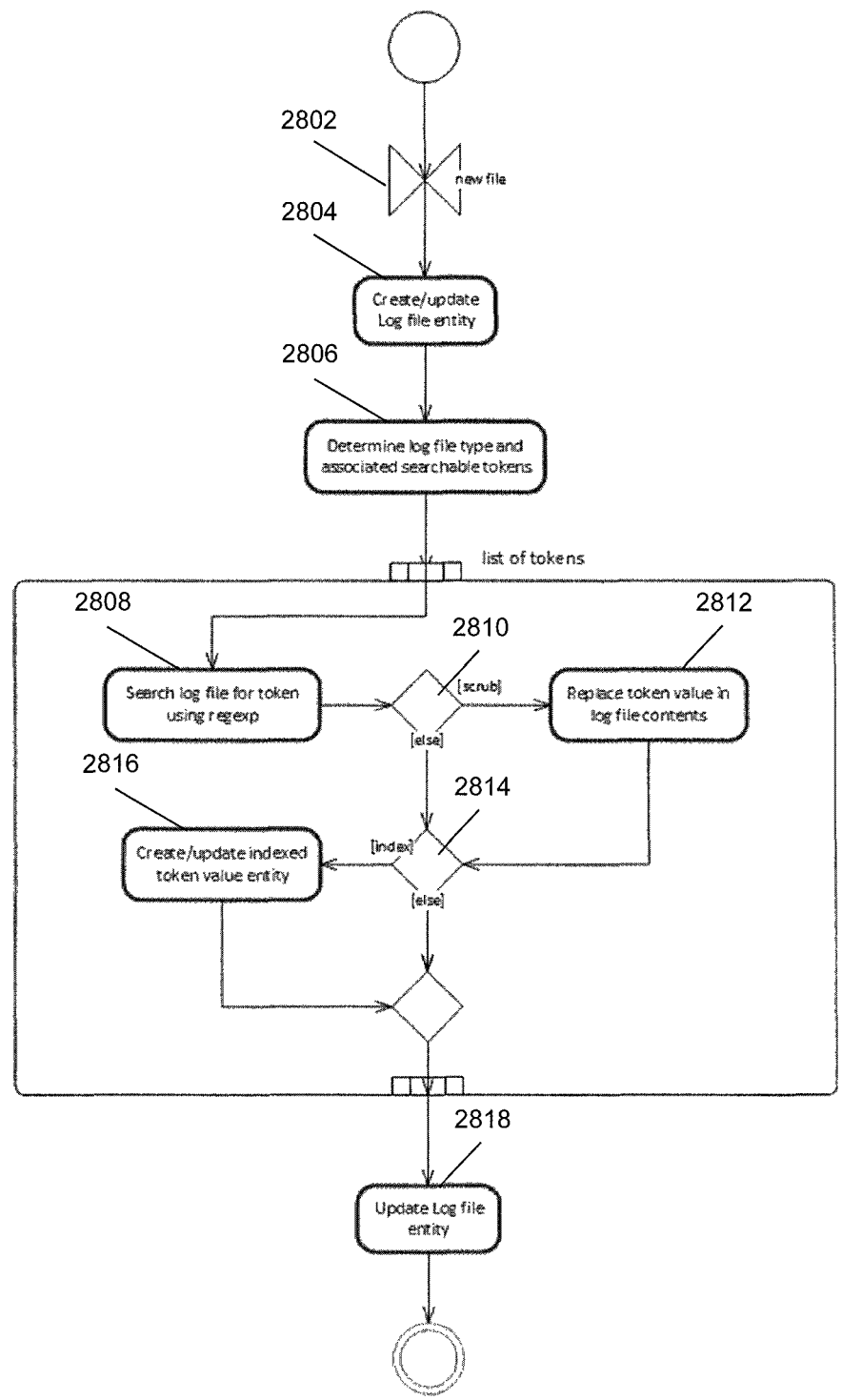
FIG. 28 is a flowchart illustrating a method for processing incoming log files according to one embodiment of the present invention.

FIG. 28 is a flowchart illustrating a method for processing incoming log files according to one embodiment of the present invention. When a new file arrives in step 2802, the log manager records the new file in the central log storage repository inventory in step 2804. The log manager then determines the file type and associated searchable tokens in step 2806 (e.g., by identifying the proper log type searchable token for the associated file type). For every token in the list of tokens, the log manager searches the new file for the token (e.g., using regular expressions) in step 2808. The token is then checked to see if it is a token that should be scrubbed in step 2810. If so, the token value is replaced in the log file in step 2812. The token is then checked to see if it is a token that should be indexed in step 2814. If so, then the index is updated in step 2816 with the token value and the location of the token in the log file. Finally, the log file entity is updated in step 2818.

In one embodiment of the present invention, during the initial setup of the logging server within a computer system, the configuration server 130 is queried to determine the current log configuration status of applications running on the application servers 110. A category of deployment may be identified based on, for example, the size of the computer system that the logging server is deployed within and the log configuration status is compared against recommended settings for the identified category. If the configuration settings differ from the recommended settings, the initial setup procedure recommends changing the configuration settings to match the recommended settings and automatically makes the appropriate changes to the configuration server if the user accepts the proposed changes.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, while embodiments of the present invention have been described herein in the context of collecting logs from application servers within a contact center, embodiments of the present invention may also be used in other types of customer sites that include computer systems in which there is a need to collect logs from a collection of application servers configured to support different tasks. For example, embodiments of the present invention may be used to collect logs from data storage and management systems, human resources information tracking systems, accounting systems, internal metrics tracking systems, etc.

What is claimed is:

1. A system comprising:
a processor; and
a memory, wherein the memory stores instructions that, when executed by the processor, cause the processor to:
retrieve, by a log collection server over a network, a first log from a first server corresponding to a contact center, the log collection server connected to the first server through the network, wherein the first server being identified based on a relationship graph derived from configuration information regarding interrelationships and interdependencies of applications running on the one or more servers;
generate, by the log collection server, an index of values in the first log;
update, by the log collection server an index database based on the index; and
save the first log on a storage device coupled to the log collection server,
wherein the memory further stores instructions that, when executed by the processor, cause the processor to process the first log before saving the first log on the storage device by:
determining a file type of the first log;
determining one or more searchable tokens associated with the file type;
searching the first log for the one or more searchable tokens to identify a plurality of logs matching a search criteria, wherein the search criteria comprising at least one of an error code or a session identifier;
determining whether the token is scrubbed based on whether the token comprises sensitive or private data;
in response to determining that the token is scrubbed, replacing the plurality of logs matched the search criteria with scrubbed data;
in response to determining that the token is not scrubbed, leaving the token unmodified; and
updating the index with a value of the token and a location of the token in the first log.

2. The system of claim 1, wherein the memory further stores instructions that, when executed by the processor, cause the processor to retrieve a second log from a second server of a plurality of servers.

3. The system of claim 2, wherein the first log and the second log are generated by different software applications.

4. The system of claim 2, wherein the first server and the second server are associated with different contact centers.

5. The system of claim 1, wherein the memory further stores instructions that, when executed by the processor, cause the processor to compress the first log before saving the first log on the storage device.

6. The system of claim 1, wherein the memory further stores instructions that, when executed by the processor, cause the processor to purge a plurality of log files from the storage device, wherein the purged log files are older than a set time period.

7. The system of claim 1, wherein the log collection server is accessible by a remote server outside the network, and wherein the first server is not accessible by the remote server outside the network.

8. A system comprising:
a processor; and
a memory, wherein the memory stores instructions that, when executed by the processor, cause the processor to:
receive, at a log collection server, a request for logs, the request comprising search criteria comprising at least one of an error code or a session identifier;
search, by the log collection server, an index database for the search criteria;
connect, by the log collection server, to one or more servers through a network, the one or more servers corresponding to at least one contact center, the one or more servers being identified in based on a relationship graph derived from configuration information regarding interrelationships and interdependencies of applications running on the one or more servers;
retrieve, by the log collection server, a plurality of logs matching the search criteria, the logs being collected from one or more servers that are connected through the network;
for each log of the plurality of logs:
determine a file type of the log;
determine one or more searchable tokens associated with the file type;
search the log for the one or more searchable tokens to identify the plurality of logs matching the search criteria, wherein the search criteria comprising at least one of an error code or a session identifier;
determine if the token is scrubbed based on whether the token comprises sensitive or private data;
in response to determining that the token is scrubbed, replace the plurality of logs matching the search criteria with scrubbed data; and
in response to determining that the token is not scrubbed, leave the token unmodified; and
package the retrieved logs into a file saved on a storage device coupled to the log collection server.

9. The system of claim 8, wherein the request further comprises filtering criteria, and
the memory further stores instructions that, when executed by the processor, cause the processor to filter the retrieved logs to remove lines to return only lines that match the filtering criteria.

10. The system of claim 9, wherein the filtering criteria comprises at least one of an error code, a session identifier, a log level, and a keyword.

11. The system of claim 8, wherein the search criteria comprises a service request number.

12. The system of claim 8, wherein the log collection server is accessible by a remote server outside the network, and wherein the one or more servers are not accessible by the remote server outside the network.

* * * * *